US012761590B2

(12) United States Patent
Matsumoto et al.

(10) Patent No.: US 12,761,590 B2
(45) Date of Patent: Oct. 13, 2026

(54) HEATING DEVICE INCLUDING THERMAL CONDUCTOR HAVING ARM AND PROJECTION, FIXING DEVICE, AND IMAGE FORMING APPARATUS

(71) Applicants: Yuma Matsumoto, Kanagawa (JP); Yuusuke Furuichi, Kanagawa (JP); Hitoshi Fujiwara, Kanagawa (JP); Keitaro Shoji, Kanagawa (JP); Yasunori Ishigaya, Kanagawa (JP)

(72) Inventors: Yuma Matsumoto, Kanagawa (JP); Yuusuke Furuichi, Kanagawa (JP); Hitoshi Fujiwara, Kanagawa (JP); Keitaro Shoji, Kanagawa (JP); Yasunori Ishigaya, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 43 days.

(21) Appl. No.: 18/968,541

(22) Filed: Dec. 4, 2024

(65) Prior Publication Data

US 2025/0189915 A1 Jun. 12, 2025

(30) Foreign Application Priority Data

Dec. 6, 2023 (JP) ................................ 2023-205962

(51) Int. Cl.
*G03G 15/20* (2006.01)
*G03G 21/16* (2006.01)

(52) U.S. Cl.
CPC ..... *G03G 15/2053* (2013.01); *G03G 15/2042* (2013.01); *G03G 15/2064* (2013.01); *G03G 21/1647* (2013.01); *G03G 2215/2035* (2013.01)

(58) Field of Classification Search
None
See application file for complete search history.

(56) References Cited

U.S. PATENT DOCUMENTS

| | | | | |
|---|---|---|---|---|
| 9,217,972 B2 * | 12/2015 | Taguchi | ............ | G03G 15/2053 |
| 2015/0153692 A1 * | 6/2015 | Matsubara | ......... | G03G 15/2042 399/329 |

(Continued)

FOREIGN PATENT DOCUMENTS

| | | |
|---|---|---|
| JP | 2001356623 A * | 12/2001 |
| JP | 2015-152752 A | 8/2015 |

(Continued)

OTHER PUBLICATIONS

English machine translation of JP-2001356623-A (Year: 2001).*

*Primary Examiner* — Arlene Heredia Ocasio
(74) *Attorney, Agent, or Firm* — XSENSUS LLP

(57) ABSTRACT

A heating device includes a rotator, a heater, a holder, a temperature sensor, and a thermal conductor. The heater faces an inner face of the rotator, extends in a longitudinal direction, and includes a base and a heat generator having a main heat generation region. The temperature sensor inside the rotator faces one end of the main heat generation region and includes a terminal. The thermal conductor on the heater extends in the longitudinal direction, has a high thermal conductivity, and includes a main portion having a first cross-sectional area, an arm having a second cross-sectional area smaller than the first cross-sectional area, and a projection. The arm extends from one end of the main portion closer to the temperature sensor than another end of the main portion. The projection projects from one end of the arm and is separated from the terminal by an insulation distance or more.

18 Claims, 11 Drawing Sheets

(56) References Cited

U.S. PATENT DOCUMENTS

| | | | | |
|---|---|---|---|---|
| 2023/0288852 | A1* | 9/2023 | Ishigaya ............ | G03G 15/2053 |
| 2023/0367252 | A1* | 11/2023 | Matsumoto ........ | G03G 15/6529 |
| 2023/0384719 | A1 | 11/2023 | Matsumoto et al. | |

FOREIGN PATENT DOCUMENTS

| | | | |
|---|---|---|---|
| JP | 2017-219613 | A | 12/2017 |
| JP | 2023-131442 | A | 9/2023 |

* cited by examiner

HEATING DEVICE INCLUDING THERMAL CONDUCTOR HAVING ARM AND PROJECTION, FIXING DEVICE, AND IMAGE FORMING APPARATUS

CROSS-REFERENCE TO RELATED APPLICATION

This patent application is based on and claims priority pursuant to 35 U.S.C. § 119(a) to Japanese Patent Application No. 2023-205962, filed on Dec. 6, 2023, in the Japan Patent Office, the entire disclosure of which is hereby incorporated by reference herein.

BACKGROUND

Technical Field

Embodiments of the present disclosure relate to a heating device, a fixing device, and an image forming apparatus.

Related Art

One type of image forming apparatus includes a fixing device that is a heating device. One type of the fixing device includes a fixing belt as a rotator, a planar heater as a heater, a thermal equalization plate as a high thermal conductor, and a thermistor as a temperature sensor. The planar heater is disposed inside the loop of the fixing belt. The thermal equalization plate enhances heat transfer in a longitudinal direction of the heater to reduce temperature unevenness in the longitudinal direction. The thermistor detects a temperature of the heater.

SUMMARY

This specification describes an improved heating device that includes a rotator, a heater, a holder, a temperature sensor, and a thermal conductor. The heater faces an inner face of the rotator, extends in a longitudinal direction, and includes a base and a heat generator that has a main heat generation region extending from one end to another end in the longitudinal direction. The holder holds the heater. The temperature sensor is disposed inside a loop of the rotator, faces one end of the main heat generation region, and includes a terminal. The thermal conductor on the heater extends in the longitudinal direction and has a thermal conductivity higher than the base of the heater. The thermal conductor includes a main portion, an arm, and a projection. The main portion has a first cross-sectional area in a cross section orthogonal to the longitudinal direction. The arm extends from one end of the main portion in the longitudinal direction, and the one end is closer to the temperature sensor than another end of the main portion. The arm has a second cross-sectional area in a cross-section orthogonal to the longitudinal direction smaller than the first cross-sectional area of the main portion. The projection projects from one end of the arm in the longitudinal direction and is separated from the terminal of the temperature sensor by an insulation distance or more in the longitudinal direction.

This specification also describes an improved heating device that includes a rotator, a heater, a holder, a temperature sensor, and a thermal conductor. The heater faces an inner face of the rotator, extends in a longitudinal direction, and includes a base and a heat generator that has a main heat generation region extending from one end to another end in the longitudinal direction. The holder holds the heater. The temperature sensor is disposed inside a loop of the rotator, faces one end of the main heat generation region, and includes a terminal. The thermal conductor on the heater extends in the longitudinal direction and has a thermal conductivity higher than the base of the heater. The thermal conductor includes a main portion, an arm, and a projection. The main portion has a first width in a short-side direction orthogonal to the longitudinal direction. The arm extends from one end of the main portion in the longitudinal direction, and the one end closer to the temperature sensor than another end of the main portion. The arm has a second width in the short-side direction smaller than the first width of the main portion. The projection projects from one end of the arm in the longitudinal direction and is separated from the terminal of the temperature sensor by an insulation distance or more in the longitudinal direction.

This specification further describes a fixing device that includes the heating device and an image forming apparatus that includes the fixing device.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
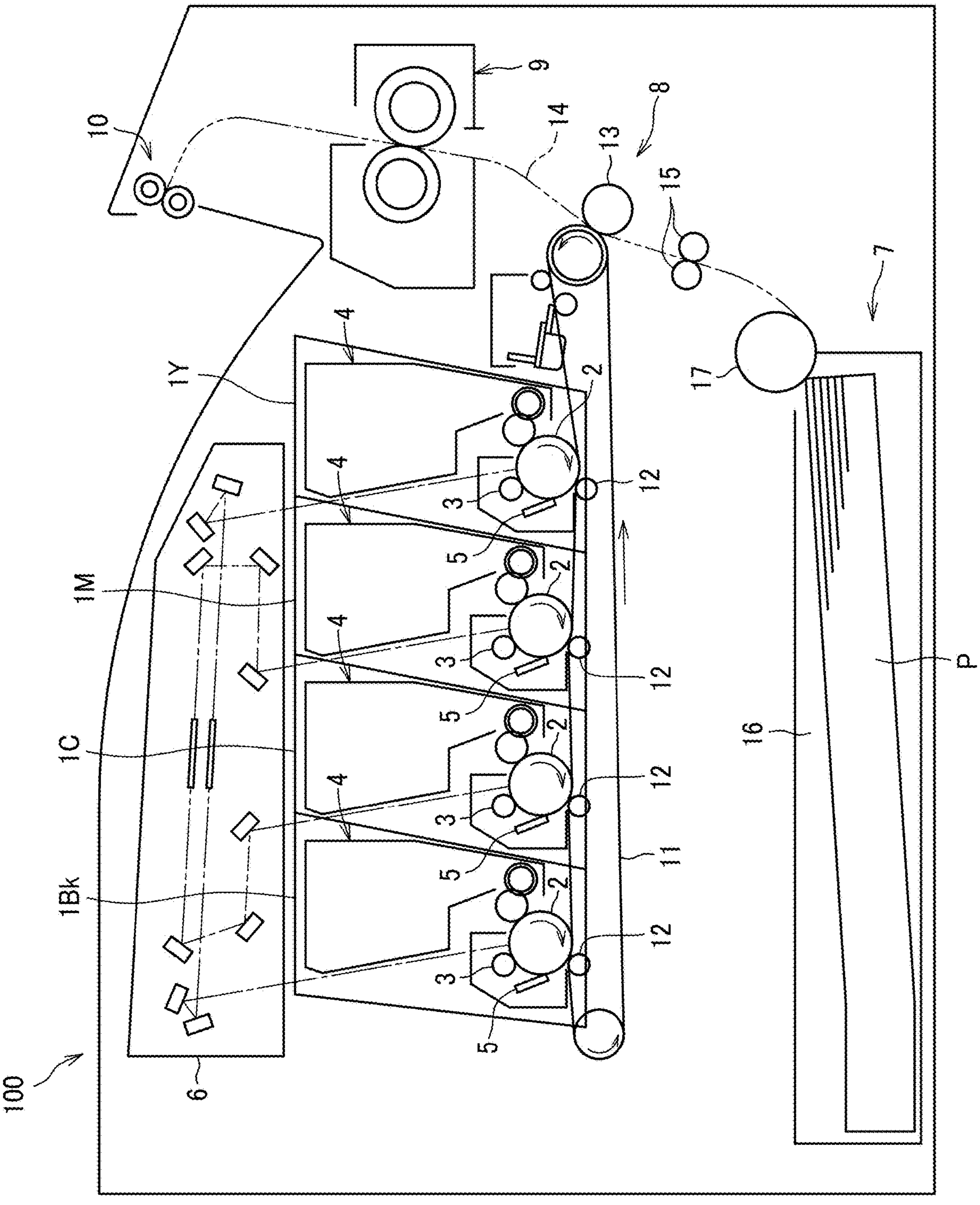
FIG. 1 is a schematic diagram illustrating a configuration of an image forming apparatus.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms “a,” “an,” and “the” are intended to include the plural forms as well, unless the context clearly indicates otherwise.

Referring to the drawings, embodiments of the present disclosure are described below. Like reference signs are assigned to identical or equivalent components and a description of those components may be simplified or omitted. As one example of a heating device, the following describes a fixing device to fix an image onto a sheet as a recording medium.

FIG. 1 is a schematic diagram of a configuration of an image forming apparatus 100.

The image forming apparatus 100 illustrated in FIG. 1 includes four image forming units 1Y, 1M, 1C, and 1Bk detachably attached to an image forming apparatus body. The image forming units 1Y, 1M, 1C, and 1Bk have substantially the same configuration except for containing different color developers, i.e., yellow (Y), magenta (M), cyan (C), and black (Bk) toners, respectively. The colors of the developers correspond to color separation components of full-color images. Each of the image forming units 1Y, 1M, 1C, and 1Bk includes a drum-shaped photoconductor 2 as an image bearer, a charging device 3, a developing device 4, and a cleaning device 5. The charging device 3 charges the surface of the photoconductor 2. The developing device 4 supplies the toner as the developer to the surface of the photoconductor 2 to form a toner image. The cleaning device 5 cleans the surface of the photoconductor 2.

The photoconductor 2 is, for example, an inorganic photoconductor such as amorphous silicon or selenium, or an organic photoconductor such as titanyl phthalocyanine. As the organic photoconductor, one such photoconductor includes a laminated type photoconductor having a laminated structure containing a layer (charge generation layer) in which charge-generating materials such as non-metallic phthalocyanine or titanyl phthalocyanine are dispersed in a binder resin and a layer (charge transport layer) in which charge transport materials are dispersed in a binder resin. These layers are stacked on a support such as an aluminum drum. Another example is a single-layer type photoconductor having a single-layer structure with a photosensitive layer containing both charge-generating materials and charge transport materials dispersed in a binder resin on a support. In the single-layer type photoconductor, it is also possible to add hole transport agents and electron transport agents as charge transport materials to the photosensitive layer. Additionally, the option exists to include an undercoat layer between the substrate and either the charge-generating layer in the laminate photoconductor or the photosensitive layer in the single-layer photoconductor The image forming apparatus 100 includes an exposure device 6, a sheet feeder 7 as a recording medium feeder, a transfer device 8, a fixing device 9 as the heating device, and a sheet ejection device 10. The exposure device 6 exposes the surface of the photoconductor 2 to form an electrostatic latent image on the surface of the photoconductor 2. The sheet feeder 7 includes a sheet tray 16 and a sheet feed roller 17. The sheet feeder 7 supplies a sheet P as a recording medium to a sheet conveyance path 14 as a recording medium path. The transfer device 8 transfers the toner images formed on the photoconductors 2 onto the sheet P. The fixing device 9 fixes the toner image transferred onto the sheet P to the surface of the sheet P. The sheet ejection device 10 ejects the sheet P outside the image forming apparatus 100. The image forming units 1Y, 1M, 1C, and 1Bk, photoconductors 2, the charging devices 3, the exposure device 6, and the transfer device 8 configure an image forming device that forms the toner image on the sheet P.

The transfer device 8 includes an intermediate transfer belt 11 having an endless form and serving as an intermediate transferor, four primary transfer rollers 12 serving as primary transferors, and a secondary transfer roller 13 serving as a secondary transferor. The intermediate transfer belt 11 is stretched around a plurality of rollers. Each of the four primary transfer rollers 12 transfers the toner image from each of the photoconductors 2 onto the intermediate transfer belt 11. The secondary transfer roller 13 transfers the toner image transferred onto the intermediate transfer belt 11 onto the sheet P. The four primary transfer rollers 12 are in contact with the respective photoconductors 2 via the intermediate transfer belt 11. Thus, the intermediate transfer belt 11 contacts each of the photoconductors 2, forming a primary transfer nip between the intermediate transfer belt 11 and each of the photoconductors 2.

The secondary transfer roller 13 contacts, via the intermediate transfer belt 11, one of the plurality of rollers around which the intermediate transfer belt 11 is stretched. Thus, the secondary transfer nip is formed between the secondary transfer roller 13 and the intermediate transfer belt 11. An elastic intermediate transfer belt may be used as the intermediate transferor. The elastic intermediate transfer belt may include, for example, a rigid base layer having relatively flexibility and a flexible elastic layer layered on the base layer. In addition, the intermediate transfer belt 11 may include a guide on the inner circumferential surface of the intermediate transfer belt to prevent the intermediate transfer belt 11 from meandering.

A timing roller pair 15 is disposed between the sheet feeder 7 and the secondary transfer nip defined by the secondary transfer roller 13 in the sheet conveyance path 14. Pairs of rollers including the timing roller pair 15 disposed in the sheet conveyance path 14 are conveyance members to convey the sheet P in the sheet conveyance path 14.

Referring to FIG. 1, a description is provided of printing processes performed by the image forming apparatus 100 described above.

When the image forming apparatus 100 receives an instruction to start printing, a driver drives and rotates the photoconductor 2 clockwise in FIG. 1 in each of the image forming units 1Y, 1M, 1C, and 1Bk. The charging device 3 charges the surface of the photoconductor 2 uniformly at a high electric potential. The exposure device 6 exposes the surface of each photoconductor 2 based on image data of the document read by a document reading device or print data instructed to be printed from a terminal. As a result, the potential of the exposed portion on the surface of each photoconductor 2 decreases, and an electrostatic latent image is formed on the surface of each photoconductor 2. The developing device 4 supplies toner to the electrostatic latent image formed on the photoconductor 2, forming a toner image thereon.

The toner image formed on each of the photoconductors 2 reaches the primary transfer nip defined by each of the primary transfer rollers 12 in accordance with rotation of each of the photoconductors 2. The toner images are sequentially transferred and superimposed onto the intermediate transfer belt 11 that is driven to rotate counterclockwise in FIG. 1 to form a full color toner image. The full color toner image formed on the intermediate transfer belt 11 is conveyed to the secondary transfer nip defined by the secondary transfer roller 13 in accordance with rotation of the intermediate transfer belt 11. The full color toner image is transferred onto the sheet P conveyed to the secondary transfer nip. The sheet P is supplied and fed from the sheet tray 16. The timing roller pair 15 temporarily halts the sheet P supplied from the sheet feeder 7. Then, the timing roller pair 15 conveys the sheet P to the secondary transfer nip at a time when the full color toner image formed on the intermediate transfer belt 11 reaches the secondary transfer nip. Thus, the full-color toner image is transferred onto and borne on the sheet P. After the toner image is transferred from each of the photoconductors 2 onto the intermediate transfer belt 11, each of cleaning devices 5 removes residual toner on each of the photoconductors 2.

The sheet P transferred with the full-color toner image is conveyed to the fixing device 9 that fixes the full-color toner image on the sheet P. Thereafter, the sheet ejection device 10 ejects the sheet P onto the outside of the image forming apparatus 100, thus finishing a series of printing processes.

Figure 2:
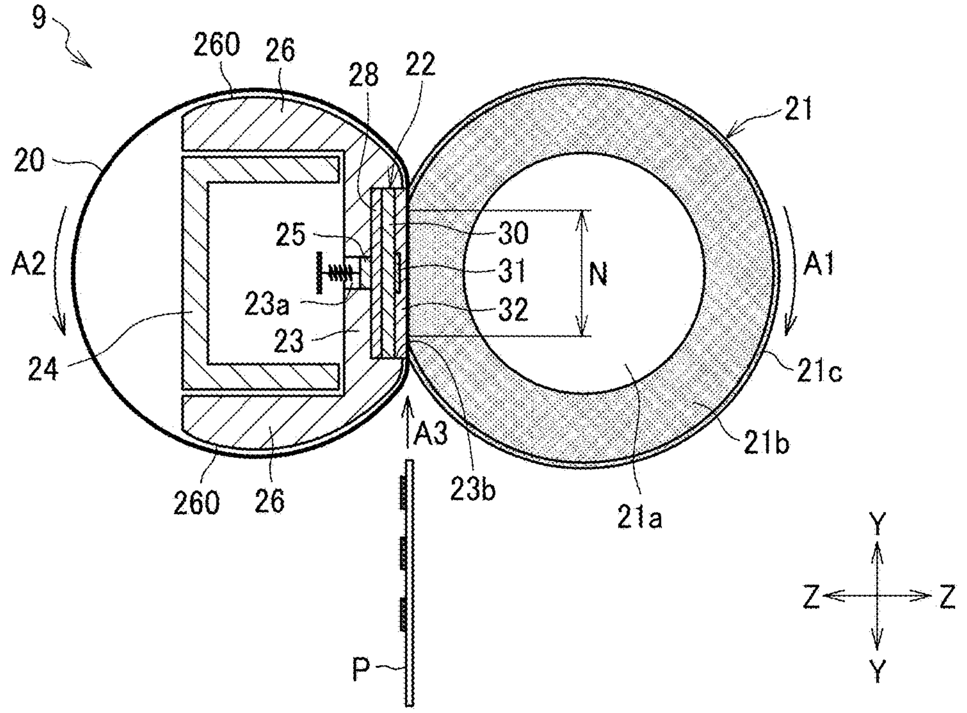
FIG. 2 is a schematic cross-sectional side view of a fixing device.

Subsequently, the configuration of the fixing device is described with reference to FIG. 2. FIG. 2 is a schematic cross-sectional side view of the fixing device 9.

As illustrated in FIG. 2, the fixing device 9 includes a fixing belt 20, a pressure roller 21 as a pressure rotator, a heater 22 as a heater, a heater holder 23 as a holder, a stay 24 as a support, a thermistor 25 as a temperature sensor, a thermal equalization plate 28 as a high thermal conductor, and a thermostat. The fixing belt 20 is an endless belt. The pressure roller 21 is in contact with the outer circumferential surface of the fixing belt 20 to form a fixing nip N between the pressure roller 21 and the fixing belt 20. The heater 22 heats the fixing belt 20. The heater holder 23 holds the heater 22. The stay 24 supports the heater holder 23. The thermistor 25 contacts the back face of the thermal equalization plate 28 to detect the temperature of the heater 22. Alternatively, the thermistor 25 may contact the back face of a base of the heater 22 through a detector insertion hole of the thermal equalization plate 28 to detect the temperature of the heater 22. A fixing rotator disposed in the fixing device is an aspect of the rotator disposed in the heating device. The fixing device 9 includes the fixing belt 20 as an example of the fixing rotator.

Figure 3:
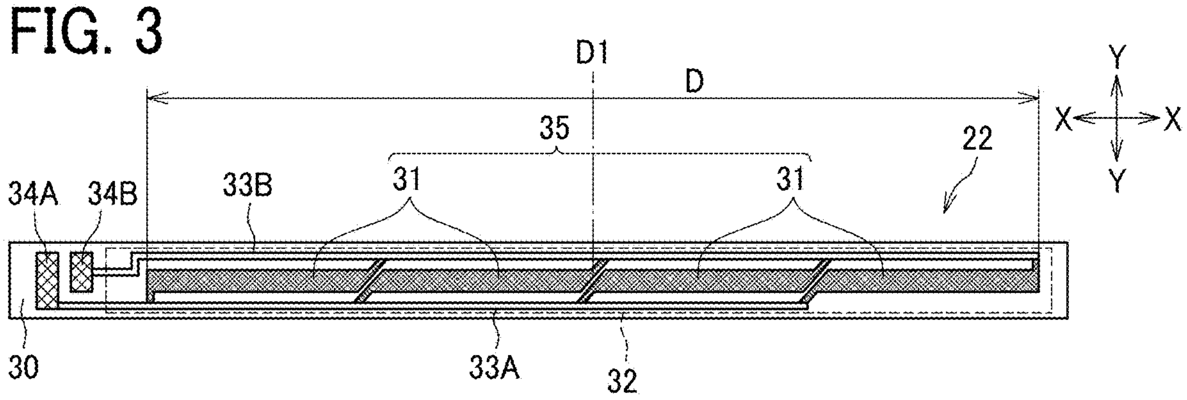
FIG. 3 is a plan view of a heater.

The fixing belt 20, the pressure roller 21, the heater 22, the heater holder 23, the stay 24, the thermal equalization plate 28, and the fixing device 9 extend in a direction perpendicular to the sheet surface of FIG. 2 (see a direction indicated by a double-headed arrow X in FIG. 3). The direction is referred to simply as a longitudinal direction below. The longitudinal direction is also a width direction of the sheet P to be conveyed, a belt width direction of the fixing belt 20, and an axial direction of the pressure roller 21. The width direction of the sheet is orthogonal to a sheet conveyance direction and a thickness direction.

The vertical direction Y in FIG. 2 is the same as the short-side direction of the heater 22, the short-side direction of the thermal equalization plate 28, the sheet conveyance direction, and the direction opposite the sheet conveyance direction. The left-right direction Z in FIG. 2 is the same as the thickness direction of a base 30, the thickness direction of the heater 22, the pressing direction of the pressure roller 21 pressed against the fixing belt 20, and the direction opposite the pressing direction. The heater 22, the thermal equalization plate 28, and the thermistor 25 are overlaid in the thickness direction of the base 30. In this specification, the expression "parts are overlaid" means a structure including another part between the parts or a structure having a space between the parts, in addition to a structure including the parts overlaid in the thickness direction to contact each other. The directions X, Y, and Z of the present embodiment are directions orthogonal to each other.

The fixing belt 20 includes a base layer configured by, for example, a tubular base made of polyimide (PI), and the tubular base has an outer diameter of 25 mm and a thickness of from 40 to 120 μm. The fixing belt 20 further includes a release layer serving as an outermost surface layer. The release layer is made of fluororesin, such as tetrafluoroethylene-perfluoroalkylvinylether copolymer (PFA) or polytetrafluoroethylene (PTFE) and has a thickness in a range of from 5 to 50 μm to enhance durability of the fixing belt 20 and facilitate separation of the sheet P and a foreign substance from the fixing belt 20. An elastic layer made of rubber having a thickness of from 50 to 500 μm may be interposed between the base layer and the release layer. The fixing belt 20 in the present embodiment may be a rubberless belt including no elastic layer. The base layer of the fixing belt 20 may be made of heat resistant resin such as polyetheretherketone (PEEK) or metal such as nickel (Ni) or steel use stainless (SUS), instead of PI. The inner circumferential surface of the fixing belt 20 may be coated with PI or PTFE as a slide layer.

The pressure roller 21 having, for example, an outer diameter of 25 mm, includes a solid iron core 21*a*, an elastic layer 21*b* formed on the surface of the core 21*a*, and a release layer 21*c* formed on the outside of the elastic layer 21*b*. The elastic layer 21*b* is made of silicone rubber and has a thickness of 3.5 mm, for example. The release layer 21*c* is a conductive layer made of perfluoroalkoxy alkane (PFA) with a conductive filler such as carbon.

The pressure roller 21 is biased toward the fixing belt 20 by a biasing member and pressed against the heater 22 via the fixing belt 20. Thus, the fixing nip N is formed between the fixing belt 20 and the pressure roller 21. A driver drives and rotates the pressure roller 21 in a direction indicated by the arrow A1 in FIG. 2, and the rotation of the pressure roller 21 rotates the fixing belt 20 in a direction indicated by the arrow A2 in FIG. 2. In other words, the direction indicated by the arrow A1 is a rotation direction of the pressure roller 21 during the image forming operations and a fixing operation, and the direction indicated by the arrow A2 is a rotation direction of the fixing belt 20 during the image forming operations and the fixing operation.

The heater 22 is disposed to contact the inner circumferential surface of the fixing belt 20. The heater 22 contacts the pressure roller 21 via the fixing belt 20 and serves as a nip formation pad to form the fixing nip N between the pressure roller 21 and the fixing belt 20. The fixing belt 20 is a heated member heated by the heater 22. In other words, the heater 22 heats the sheet P that passes through the fixing nip N via the fixing belt 20.

The heater 22 is a planar heater extending in the longitudinal direction thereof parallel to the width direction of the fixing belt 20. The heater 22 includes the base 30 having a planar shape, resistive heat generators 31 disposed on the base 30, and an insulation layer 32 covering the resistive heat generators 31. The insulation layer 32 of the heater 22 contacts the inner circumferential surface of the fixing belt 20, and the heat generated by the resistive heat generators 31 is transmitted to the fixing belt 20 through the insulation layer 32. Although the resistive heat generators 31 and the insulation layer 32 are disposed on the side of the base 30 facing the fixing belt 20 (that is, the fixing nip N) in the present embodiment, the resistive heat generators 31 and the insulation layer 32 may be disposed on the opposite side of the base 30, that is, the side facing the heater holder 23. In this case, since the heat of the resistive heat generator 31 is transmitted to the fixing belt 20 through the base 30, it is preferable that the base 30 be made of a material with high thermal conductivity such as aluminum nitride. Making the base 30 with the material having the high thermal conductivity enables to sufficiently heat the fixing belt 20 even if the resistive heat generators 31 are disposed on the side of the base 30 opposite to the side facing the fixing belt 20.

The heater holder 23 and the stay 24 are disposed inside the loop of the fixing belt 20. The stay 24 is configured by a channeled metallic member, and both side plates of the fixing device 9 support both end portions of the stay 24 in the longitudinal direction of the stay 24. Since the stay 24 supports the heater holder 23 and the heater 22, the heater 22 reliably receives a pressing force of the pressure roller 21 pressed against the fixing belt 20. Thus, the fixing nip N is stably formed between the fixing belt 20 and the pressure roller 21. In the present embodiment, the thermal conductivity of the heater holder 23 is set to be smaller than the thermal conductivity of the base 30.

Since the heater holder 23 is heated to a high temperature by heat from the heater 22, the heater holder 23 is preferably made of a heat resistant material. The heater holder 23 made of heat-resistant resin having low thermal conduction, such as a liquid crystal polymer (LCP) or PEEK, reduces heat transfer from the heater 22 to the heater holder 23. As a result, the heater 22 can efficiently heat the fixing belt 20.

The heater holder 23 has a holding recess 23*b* to hold the heater 22. The holding recess 23*b* is referred to simply as the recess 23*b*.

As illustrated in FIG. 2, the heater holder 23 includes guide ribs 26 to guide the fixing belt 20. The heater holder 23 and the guide ribs 26 may be formed as a single unit. The guide ribs 26 are disposed both upstream and downstream from the heater holder 23 in the sheet conveyance direction, along the longitudinal direction.

Each of the guide ribs 26 has a substantially fan shape. Each of the guide ribs 26 has a guide face 260 that is an arc-shaped or convex curved face extending in a belt circumferential direction along the inner circumferential face of the fixing belt 20.

The heater holder 23 has an insertion hole 23*a* in the recess 23*b*, and the insertion hole 23*a* penetrates the heater holder 23 in the thickness direction of the heater holder 23. The thermistor 25 is disposed in the insertion hole 23*a*.

The thermal equalization plate 28 as a thermal conductor is made of a material having a higher thermal conductivity than the thermal conductivity of the base 30. In the present embodiment, the thermal equalization plate 28 is made of an aluminum alloy, steel, a graphite sheet, or other conductors. Forming the thermal equalization plate 28 to have a plate shape can enhance accuracy of positioning of the heater 22 with respect to the heater holder 23 and the thermal equalization plate 28. Placing the thermal equalization plate 28 on the heater 22 enhances heat transfer in the longitudinal direction and uniforms the temperature of the heater 22, and thus the temperature of the fixing belt 20 in the longitudinal direction. The thermal equalization plate 28 made of metal has good workability and dimensional accuracy.

A description is now given of a method of calculating the thermal conductivity. In order to calculate the thermal conductivity, the thermal diffusivity of a target object is firstly measured. Using the thermal diffusivity, the thermal conductivity is calculated.

The thermal diffusivity is measured using a thermal diffusivity/conductivity measuring device (for example, trade name: AI-PHASE MOBILE 1U, manufactured by Ai-Phase co., ltd.).

In order to convert the thermal diffusivity into thermal conductivity, values of density and specific heat capacity are necessary. The density is measured by a dry automatic densitometer (trade name: ACCUPYC 1330 manufactured by Shimadzu Corporation). The specific heat capacity is measured by a differential scanning calorimeter (trade name: DSC-60 manufactured by Shimadzu Corporation), and sapphire is used as a reference material in which the specific heat capacity is known. In the present embodiment, the specific heat capacity was measured five times, and an average value was calculated and used to obtain the thermal conductivity. A temperature condition was 50° C.

The thermal conductivity λ is obtained by the following expression (1).

$$\lambda=\rho\times C\times\alpha. \quad (1)$$

where ρ is the density, C is the specific heat capacity, and α is the thermal diffusivity obtained by the thermal diffusivity measurement described above.

When the fixing device 9 according to the present embodiment starts printing, the pressure roller 21 is driven to rotate, and the fixing belt 20 starts to be rotated. The guide face 260 of each of the guide ribs 26 contacts and guides the inner circumferential face of the fixing belt 20 to stably and smoothly rotates the fixing belt 20. As power is supplied to the resistive heat generators 31 of the heater 22, the heater 22 heats the fixing belt 20. When the temperature of the fixing belt 20 reaches a predetermined target temperature which is called a fixing temperature, as illustrated in FIG. 2, the sheet P bearing an unfixed toner image is conveyed in a direction indicated by the arrow A3 in FIG. 2 to the fixing nip N between the fixing belt 20 and the pressure roller 21, and the unfixed toner image is heated and pressed to be fixed to the sheet P.

A detailed description is now given of the heater disposed in the above-described fixing device, with reference to FIG. 3. FIG. 3 is a plan view of the heater according to the present embodiment.

As illustrated in FIG. 3, the heater 22 includes the planar base 30. On the surface of the base 30, a plurality of resistive heat generators 31 (four resistive heat generators 31), power supply lines 33A and 33B that are conductors, a first electrode 34A, and a second electrode 34B are disposed. However, the number of resistive heat generators 31 is not limited to four in the present embodiment. The power supply lines 33A and 33B are also referred to as power supply lines 33, and the first electrode 34A and the second electrode 34B are also referred to as electrodes 34.

A lateral direction X in FIG. 3 is the longitudinal direction of the heater 22, a direction orthogonal to a surface of the paper on which FIG. 2 is drawn, and an arrangement direction of the plurality of resistive heat generators 31. The direction X is also referred to as the arrangement direction in the following description. In addition, a direction that intersects the arrangement direction of the plurality of resistive heat generators 31 and is different from a thickness direction of the base 30 is referred to as a direction intersecting the arrangement direction. In the present embodiment, the direction intersecting the arrangement direction is the vertical direction Y in FIG. 3. The direction Y intersecting the arrangement direction is a direction along the surface of the base 30 on which the resistive heat generators 31 are arranged and is also a short-side direction of the heater 22 and a conveyance direction of the sheet passing through the fixing device 9.

The resistive heat generators 31 configure a heat generation portion 35 including portions arranged in the arrangement direction. The resistive heat generators 31 are electrically coupled in parallel to a pair of electrodes 34A and 34B via the power supply lines 33A and 33B. The pair of electrodes 34A and 34B is disposed on one end of the base 30 in the arrangement direction that is a left end of the base 30 in FIG. 3. The power supply lines 33A and 33B are made of conductors having an electrical resistance value smaller than an electrical resistance value of the resistive heat generator 31.

The resistive heat generator 31 is made of a material having a positive temperature coefficient (PTC) of resistance that is a characteristic that the resistance value increases to decrease the heater output as the temperature T increases.

Dividing the heat generation portion 35 configured by the resistive heat generators 31 having the PTC characteristic in the arrangement direction prevents overheating of the fixing belt 20 when small sheets pass through the fixing device 9. When the small sheets each having a width smaller than the entire width of the heat generation portion 35 pass through the fixing device 9, the temperature of a region of the resistive heat generator 31 corresponding to a region of the fixing belt 20 that is not in contact with the small sheet increases because the small sheet does not absorb heat of the fixing belt 20 in the region that is not in contact with the small sheet, in other words, the region outside a small sheet passing region of the fixing belt 20 on which the small sheet passes. Since a constant voltage is applied to the resistive heat generators 31, the temperature increase in the regions facing outsides of the small sheet passing region causes the increase in resistance values of the resistive heat generators 31. The increase in temperature relatively reduces outputs (that is, heat generation amounts) of the heater in the regions, thus preventing an increase in temperature in the regions that are end portions of the fixing belt outside the small sheets. Electrically coupling the plurality of resistive heat generators 31 in parallel can prevent a rise of temperature in non-sheet passing regions while maintaining the printing speed.

The heat generator that configures the heat generation portion 35 may not be the resistive heat generator having the PTC characteristic. The resistive heat generators in the heater 22 may be arranged in a plurality of rows arranged in the direction intersecting the arrangement direction.

The resistive heat generator 31 is produced by, for example, mixing silver-palladium (AgPd) and glass powder into a paste. The paste is coated on the base 30 by screen printing. Finally, the base 30 is fired to form the resistive heat generator 31. The resistive heat generators 31 each have a resistance value of 80Ω at room temperature, in the present embodiment. The material of the resistive heat generators 31 may contain a resistance material, such as silver alloy (AgPt) or ruthenium oxide ($RuO_2$), other than the above material. Silver (Ag) or silver palladium (AgPd) may be used as a material of the power supply lines 33A and 33B and the electrodes 34A and 34B. Screen-printing such a material forms the power supply lines 33A and 33B and the electrodes 34A and 34B. The power supply lines 33A and 33B are made of conductors having the electrical resistance value smaller than the electrical resistance value of the resistive heat generators 31.

The material of the base 30 is preferably a nonmetallic material having excellent thermal resistance and insulating properties, such as glass, mica, or ceramic such as alumina or aluminum nitride. The heater 22 according to the present embodiment includes an alumina base having a thickness of 1.0 mm, a width of 270 mm in the arrangement direction, and a width of 8 mm in the direction intersecting the arrangement direction. The base 30 may be made by layering the insulation material on conductive material such as metal. Low-cost aluminum or stainless steel is favorable as the metal material of the base 30.

The insulation layer 32 may be, for example, a heat-resistant glass layer having a thickness of 75 μm. The insulation layer 32 covers the resistive heat generators 31 and the power supply lines 33A and 33B to insulate and protect the resistive heat generators 31 and the power supply lines 33A and 33B and maintain sliding performance with the fixing belt 20.

A region in which the resistive heat generators 31 are arranged in the longitudinal direction forms a main heat generation region D of the heater 22. The main heat generation region D includes the gap between the resistive heat generators 31. In other words, the main heat generation region D of the heater 22 is from one end of the resistive heat generator 31 disposed closest to one end of the heater 22 in the longitudinal direction, to the other end of the resistive heat generator 31 disposed closest to the other end of the heater 22 in the longitudinal direction. The heater 22 mainly generates heat in the main heat generation region D and slightly generates heat in a region outside the main heat generation region D.

Figure 4:
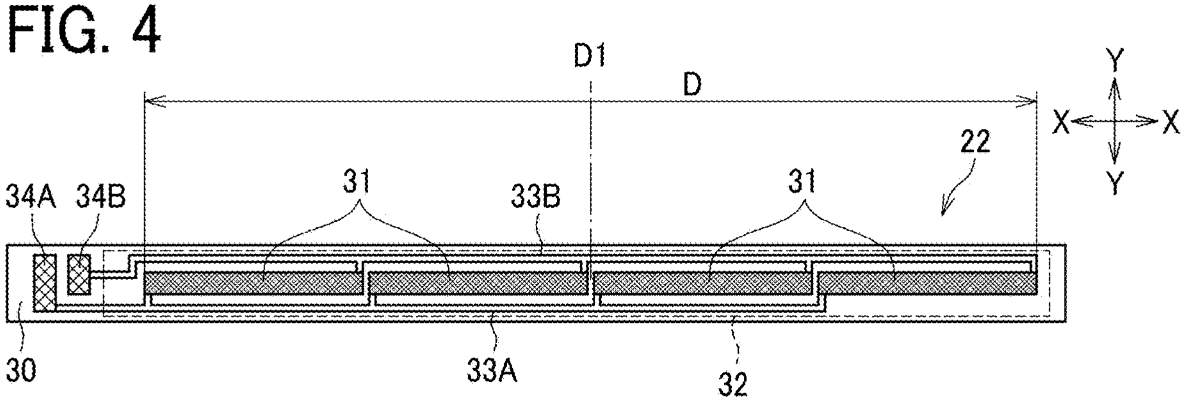
FIG. 4 is a plan view of a heater including resistive heat generators each having a form different from the form of the resistive heat generator illustrated in FIG. 3.
Figure 5:
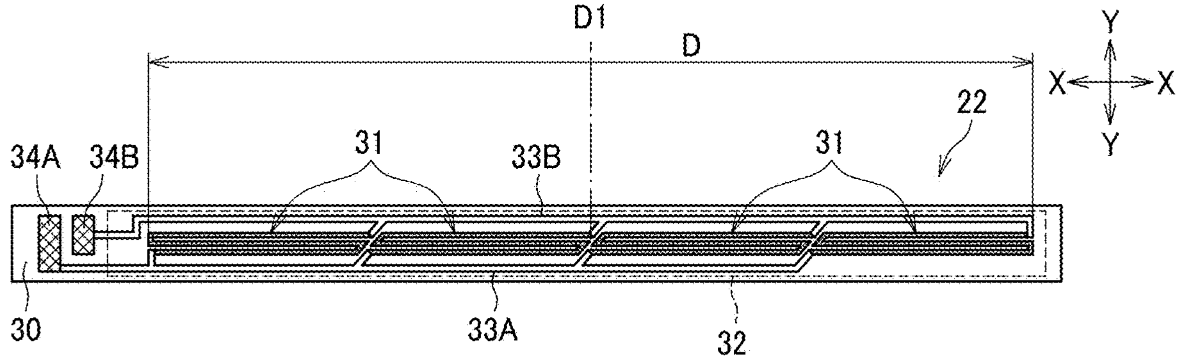
FIG. 5 is a plan view of a heater including resistive heat generators each having a form different from each of the forms of the resistive heat generators illustrated in FIGS. 3 and 4.

The first electrode 34A and the second electrode 34B are disposed on the same end portion of the base 30 in the arrangement direction in the present embodiment but may be disposed on both end portions of the base 30 in the arrangement direction. The shape of resistive heat generator 31 is not limited to the shape in the present embodiment. For example, as illustrated in FIG. 4, the shape of resistive heat generator 31 may be a rectangular shape, or as illustrated in FIG. 5, the resistive heat generator 31 may be configured by a linear portion folding back to form a substantially parallelogram shape. In addition, as illustrated in FIG. 4, portions each extending from the resistive heat generator 31 having a rectangular shape to one of the power supply lines 33A and 33B (the portion extending in the direction intersecting the arrangement direction) may be a part of the resistive heat generator 31 or may be made of the same material as the power supply lines 33A and 33B.

Figure 6:
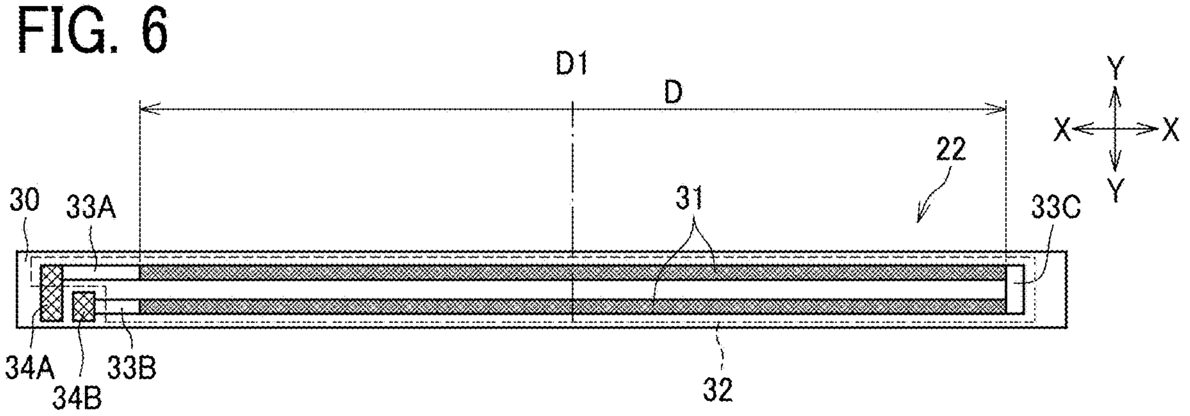
FIG. 6 is a plan view of a heater including resistive heat generators coupled in series.

The heater 22 illustrated in FIG. 6 includes two resistive heat generators 31 extending in the longitudinal direction and coupled in series. Left ends of the two resistive heat generators 31 in FIG. 6 are coupled to the electrodes 34A and 34B via power supply lines 33A and 33B, respectively. Right ends of the two resistive heat generators 31 in FIG. 6 are coupled in series via a power supply line 33C.

In the heater 22 illustrated in each of FIGS. 3 to 6, a length from the center position D1 of the main heat generation region D to the left end of the base 30 is longer than a length from the center position D1 to the right end of the base 30. This is because arranging the electrodes 34A and 34B on the left end of the base 30 in each of FIGS. 3 to 6 increases the length from the center position D1 to the left end of the base. The above-described asymmetry regarding the lengths of both ends of the base 30 increases heat generated by the heater 22 and flowing from the left end of the base 30 to the outside of the base 30 in the longitudinal direction. As a result, in the heater 22 itself, the temperature of the left side of the heater 22 in each of FIGS. 3 to 6 tends to be lower than the temperature of the right side of the heater 22. The thermistor 25 in the present embodiment is disposed on one end of the heater 22 having the higher temperature than the other end of the heater 22 on which the electrodes 34A and 34B are disposed (see FIG. 13). Since the thermistor 25 detects the higher temperature, an excessive temperature rise on an end of the heater 22 can be effectively prevented.

Figure 7:
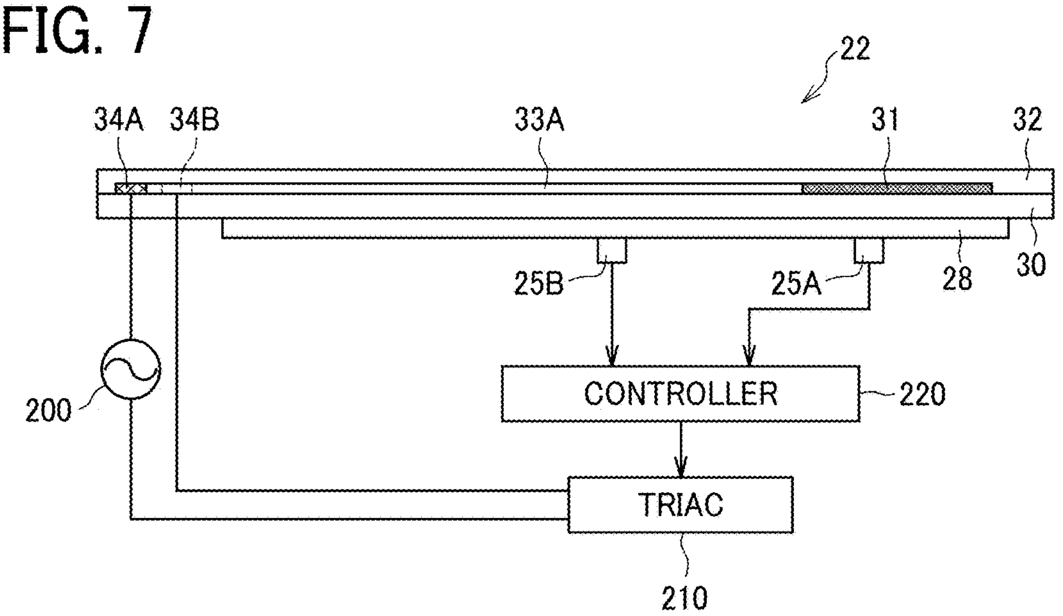
FIG. 7 is a schematic diagram illustrating a circuit to supply power to the heater.

FIG. 7 is a schematic diagram illustrating a circuit to supply power to the heater illustrated in FIG. 3.

As illustrated in FIG. 7, an alternating current power supply 200 is electrically coupled to the electrodes 34A and 34B of the heater 22 to configure a power supply circuit in the present embodiment to supply power to the resistive heat generators 31. The power supply circuit includes a triac 210 that controls an amount of power supplied. A controller 220 controls the amount of power supplied to the resistive heat generators 31 via the triac 210 based on temperatures detected by the thermistors 25A and 25B. The controller 220 includes a microcomputer including, for example, a central processing unit (CPU), a read-only memory (ROM), a random-access memory (RAM), and an input and output (I/O) interface. The controller 220 may be disposed in the fixing device or in the body of the image forming apparatus.

Figure 8:
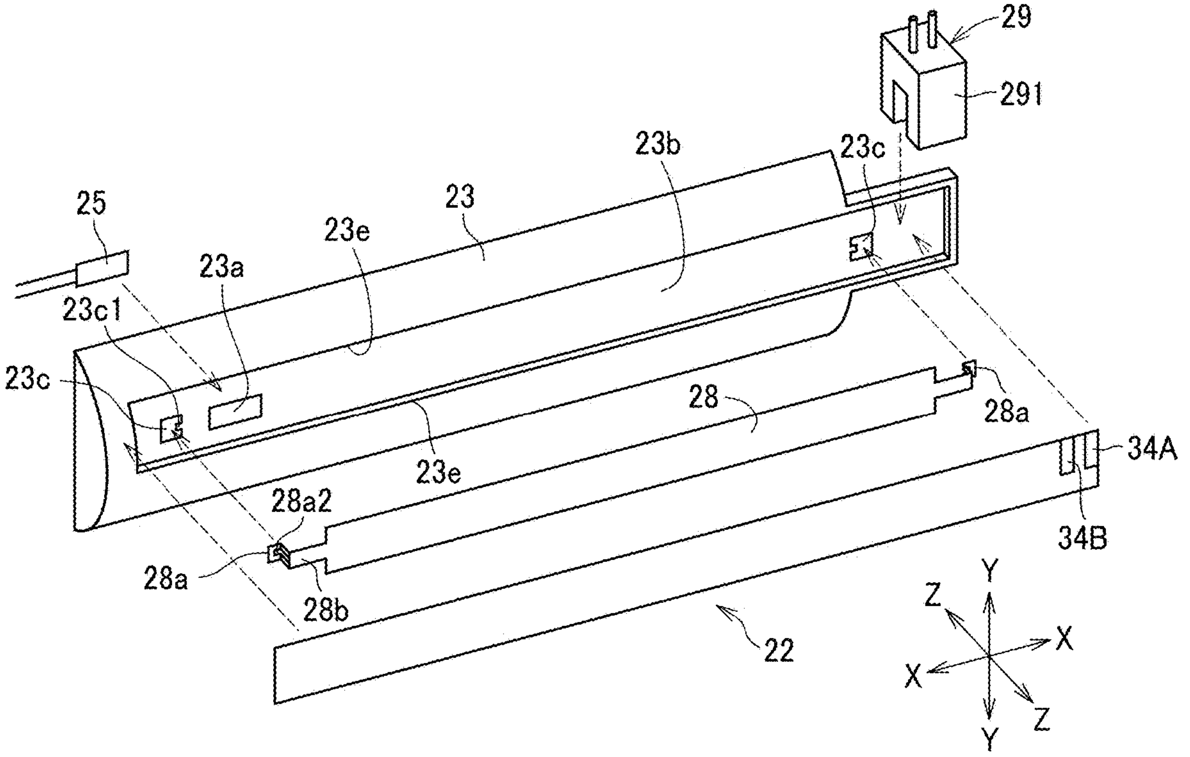
FIG. 8 is a perspective view of a heater holder, a thermal equalization plate, a heater, and a thermistor.

FIG. 8 is a perspective view of members such as a heater holder disposed inside the loop of the fixing belt 20. In the following drawings, the thermistor 25A (see FIG. 7) disposed on the one end of the main heat generation region D in the longitudinal direction is described as the thermistor 25 and is referred to simply as the thermistor 25. The one end of the main heat generation region D in the longitudinal direction is, for example, obtained by dividing the main heat generation region D into three equal parts in the longitudinal direction. One of both end parts of the three equal parts is defined as the one end of the main heat generation region D in this specification. In FIG. 8 and subsequent drawings, the thermistor 25B in FIG. 7 is omitted.

As illustrated in FIG. 8, the insertion hole 23*a* and a thermal equalization plate holding hole 23*c* are in the recess 23*b* of the heater holder 23. The heater holder 23 extends from one end to the other end in the longitudinal direction of the heater holder 23, and the other end of the heater holder 23 is a right end of the heater holder 23 in FIG. 8 and faces the first electrode 34A and the second electrode 34B. An AC connector 29 is attached to the other end of the heater holder 23. The AC connector 29 includes a terminal holder 291 including contact terminals, and the contact terminals contact the first electrode 34A and the second electrode 34B, respectively to electrically couple the heater 22 to the power supply. The thermal equalization plate 28 has bent portions 28*a* as projections at both ends of the thermal equalization plate 28 in the longitudinal direction of the thermal equalization plate 28.

When these members are assembled, the thermal equalization plate 28 is firstly fitted into the recess 23*b* of the heater holder 23. At this time, the bent portions 28*a* of the thermal equalization plate 28 are inserted into the thermal equalization plate holding holes 23*c* to engage the bent portions 28*a* with the heater holder 23, which is described in detail below. Subsequently, the heater 22 is overlaid on the thermal equalization plate 28 and fitted into the recess 23*b*. In this state, the other ends of the heater holder 23, the thermal equalization plate 28, and the heater 22 in the longitudinal direction are sandwiched by a substantial U-shape of the terminal holder 291 of the AC connector 29. As a result, the thermal equalization plate 28 and the heater 22 are fixed to the heater holder 23. The thermistor 25 is inserted into the insertion hole 23*a* from the back side of the heater holder 23, that is, from the side opposite to a heater side of the heater holder 23, the heater side facing the heater 22.

Figure 9:
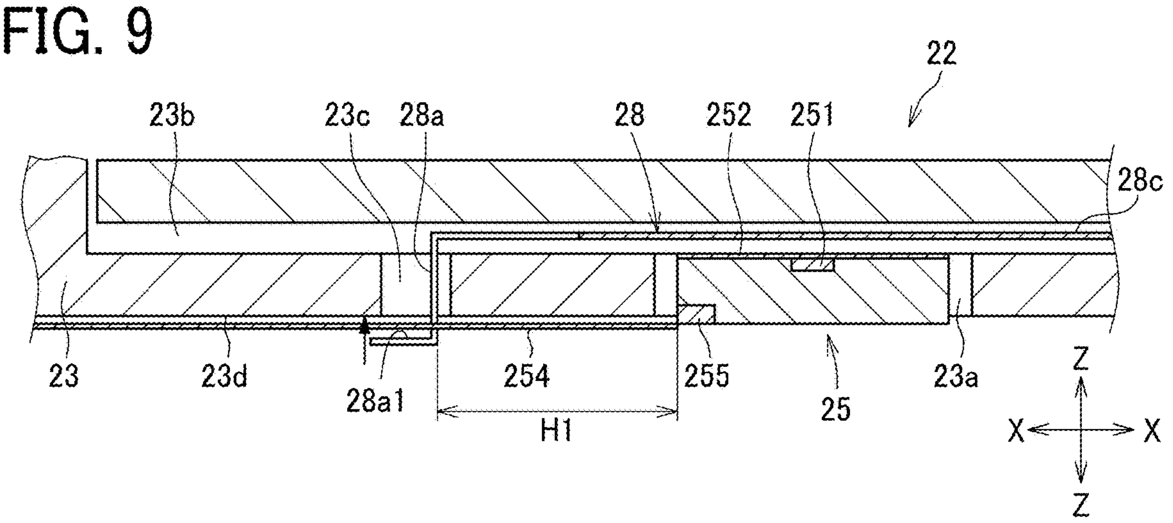
FIG. 9 is a cross-sectional view of a part of a heater holder having a holding recess in which a thermal equalization plate and a heater are attached.

FIG. 9 is a cross-sectional view of a part of the heater holder 23 having the recess 23*b* in which the thermal equalization plate 28 and the heater 22 are attached. The cross-sectional view of FIG. 9 is a cross-sectional view perpendicular to the short-side direction of the heater 22. In addition, although the heater 22, the thermal equalization plate 28, the heater holder 23, and the thermistor 25 are actually stacked with no gap in the thickness direction. In FIG. 9, for convenience, the heater 22, the thermal equalization plate 28, the heater holder 23, and the thermistor 25 are illustrated with gaps.

As illustrated in FIG. 9, the bent portion 28*a* of the thermal equalization plate 28 is formed by bending one end of the plate in the longitudinal direction twice. Specifically, one end of the plate in the longitudinal direction is bent toward the thickness direction of the plate by 90 degrees to form a first bent portion, and then a portion closer to the end in the longitudinal direction than to the first bent portion is bent by 90 degrees toward a direction opposite the direction when the first bent portion is formed to form a second bent portion. As a result, the bent portion 28*a* is formed. However, the bending angle is not necessarily 90 degrees.

The bent portion 28*a* is inserted into the thermal equalization plate holding hole 23*c* of the heater holder 23. As illustrated in FIG. 8, a projection 23*c*1 is on the side of the thermal equalization plate holding hole 23*c*, and a hole 28*a*2 is in the center of the bent portion 28*a*. When the bent portion 28*a* is inserted into the thermal equalization plate holding hole 23*c*, the projection 23*c*1 is inserted into the hole 28*a*2. When the thermal equalization plate 28 moves in a direction in which the thermal equalization plate 28 falls off from the heater holder 23, the upper face of a distal end 28*al* of the bent portion 28*a* in FIG. 9 abuts against a back side 23*d* of the heater holder 23 (see a black arrow in FIG. 9) as illustrated in FIG. 9. As a result, the bent portion 28*a* is engaged with the heater holder 23, preventing the thermal equalization plate 28 from falling off from the heater holder 23.

A heat sensitive element 251 as a temperature detector of the thermistor 25 abuts on the thermal equalization plate 28 via an insulation sheet 252. Thus, the heat sensitive element 251 can detect the temperature of the thermal equalization plate 28.

Figure 10A:
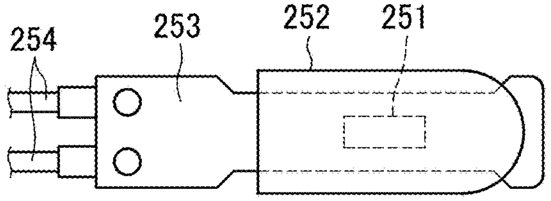
FIG. 10A is a plan view of a thermistor.
Figure 10B:
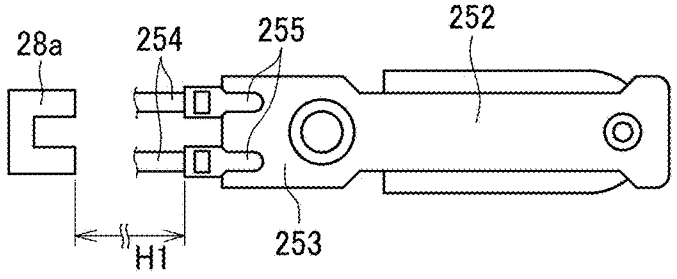
FIG. 10B is a view of a back side of the thermistor of FIG. 10A to illustrate an insulation distance between the thermistor and a thermal equalization plate.

As illustrated in FIG. 10A, the thermistor 25 includes the heat sensitive element 251 as the temperature detector, the insulation sheet 252 as an insulator, a holder 253, and a harness 254. As illustrated in FIG. 10B, the harness 254 is fixed to the holder 253 by solder portions 255 as terminals. The solder portion 255 is made of a conductor.

As illustrated in FIG. 9, the heat sensitive element 251 is in contact with the thermal equalization plate 28 via the insulation sheet 252. Besides the bent portions 28*a*, the thermal equalization plate 28 includes a main portion 28*c*. The bent portion 28*a* extends from the main portion 28*c* in the thickness direction of the base 30 that is the vertical direction in FIG. 9 and projects from the back side 23*d* of the heater holder 23 that is the lower side of the heater holder 23 in FIG. 9, and, as a result, the thermistor 25 (in particular, solder portions 255) is close to the bent portion 28*a*. An insulation distance H1 in the longitudinal direction is set between the solder portion 255 and the bent portion 28*a*. In other words, since the bent portion 28*a* projects from the lower side of the heater holder 23 in FIG. 9 in which the thermistor 25 is disposed in the present embodiment, the insulation distance H1 in the longitudinal direction is set between the solder portion 255 and the bent portion 28*a*. However, in the thermal equalization plate 28, the bent portion 28*a* is not necessarily the portion projecting most in the thickness direction from the side in which the thermistor 25 is disposed.

Figure 11:
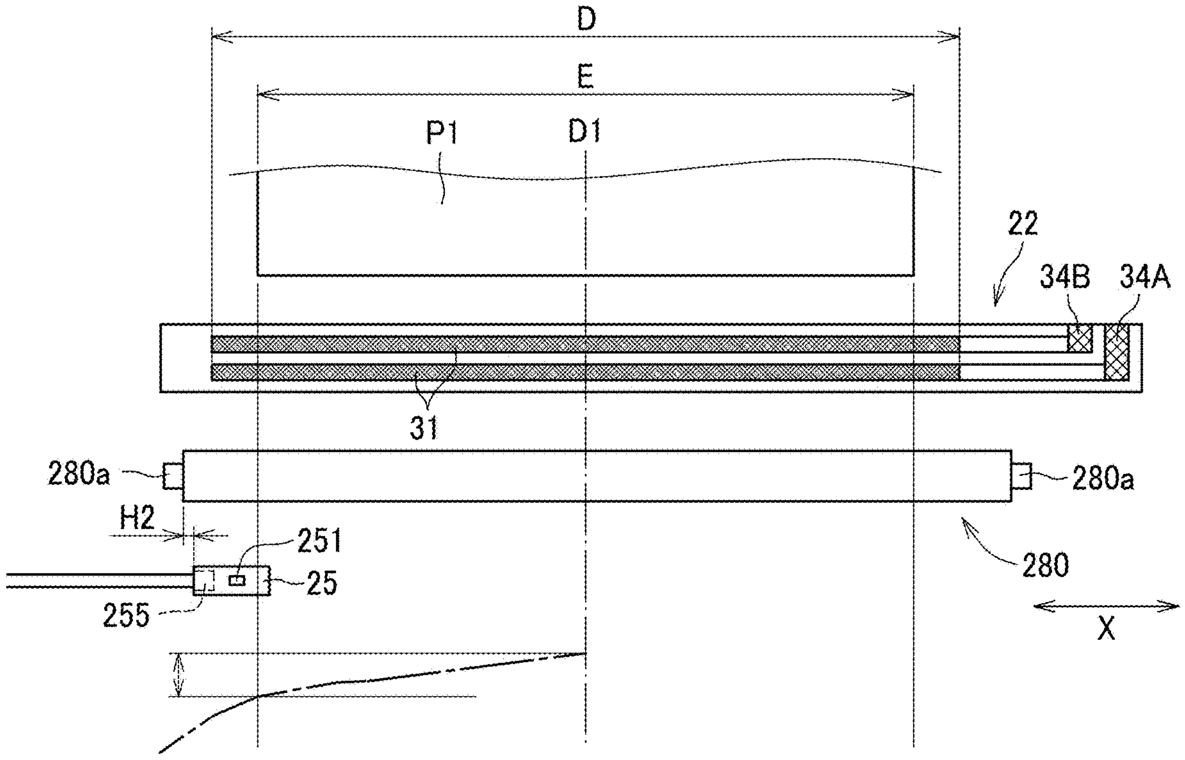
FIG. 11 is a diagram to illustrate a relationship between an insulation distance between a thermistor and a thermal equalization plate and a temperature distribution in a longitudinal direction of a fixing device including the thermal equalization plate different from a thermal equalization plate according to an embodiment of the present disclosure.
Figure 12:
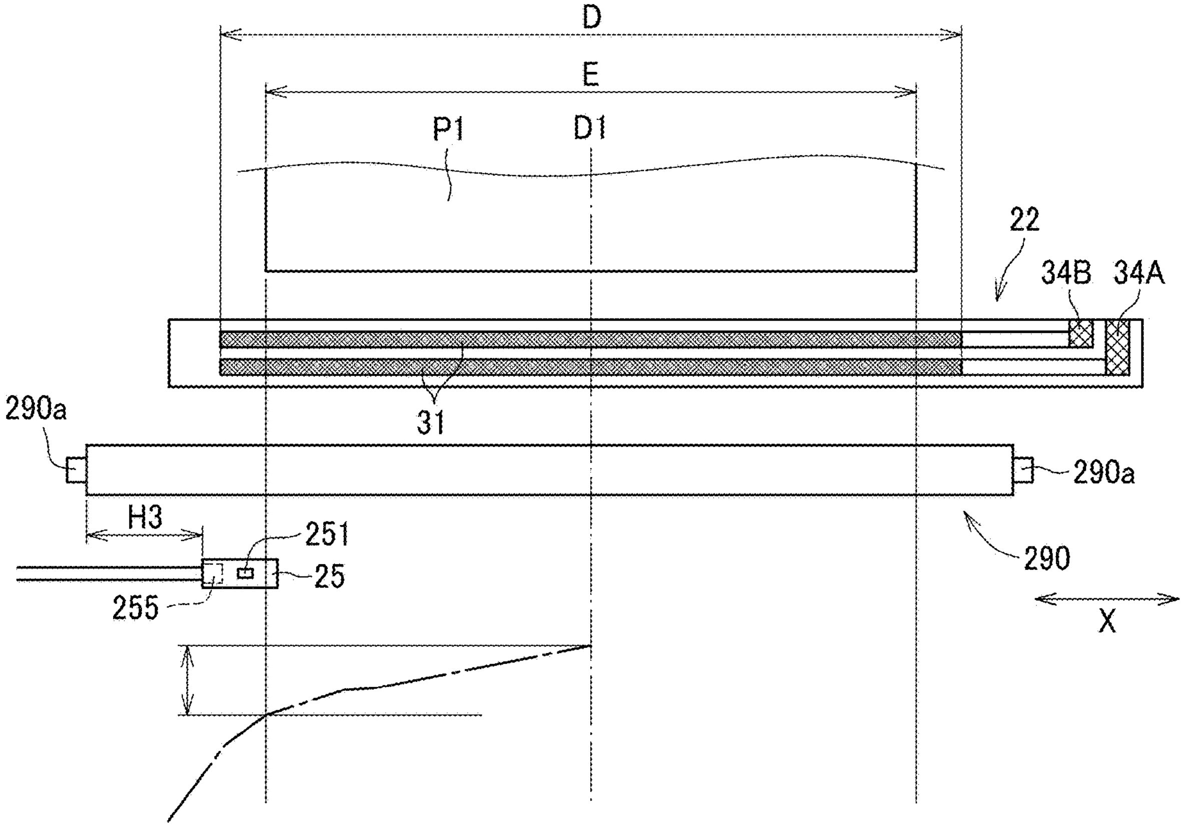
FIG. 12 is a diagram to illustrate a relationship between an insulation distance between a thermistor and a thermal equalization plate and a temperature distribution in a longitudinal direction of a fixing device including the thermal equalization plate different from the thermal equalization plate of FIG. 11 and a thermal equalization plate according to an embodiment of the present disclosure.
Figure 13:
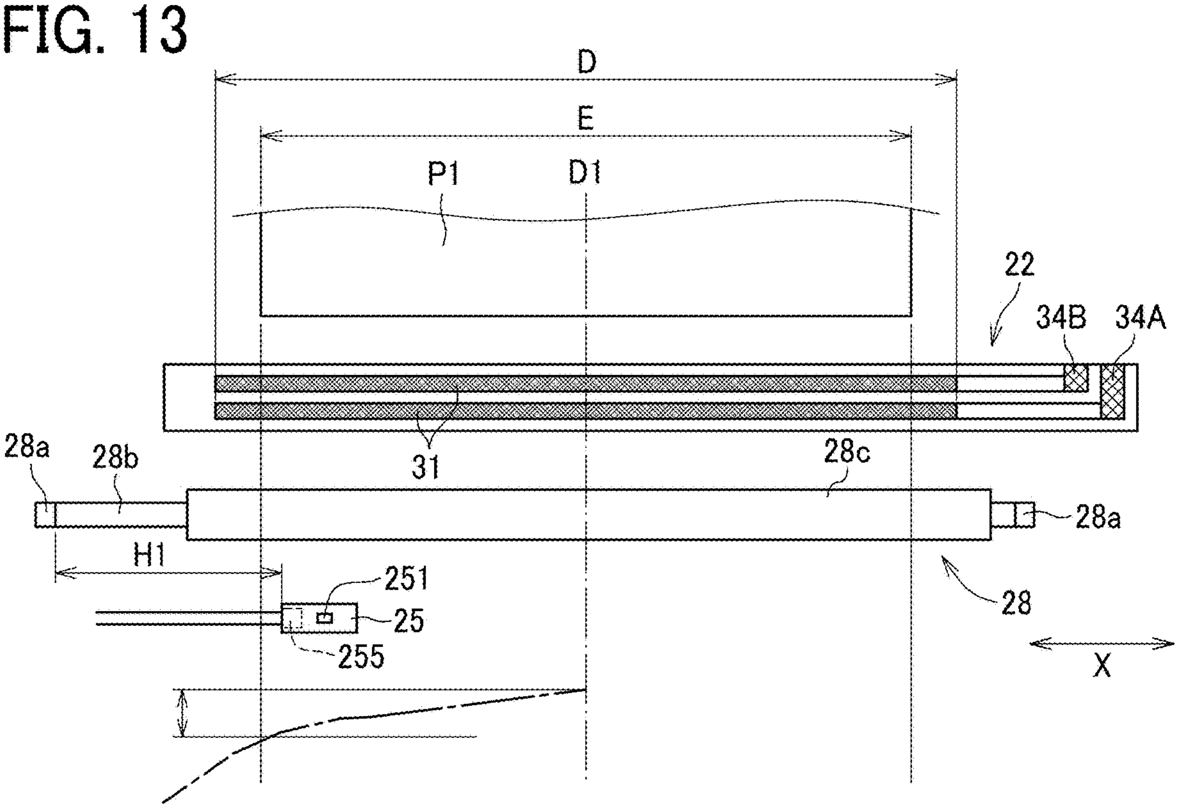
FIG. 13 is a diagram to illustrate a relationship between an insulation distance between a thermistor and a thermal equalization plate and a temperature distribution in a longitudinal direction of a fixing device including a thermal equalization plate according to an embodiment of the present disclosure.

A relationship between the insulation distance between the thermistor 25 and the thermal equalization plate 28 and the temperature distribution of the heater 22 in the longitudinal direction of the fixing device is described below with reference to FIGS. 11 to 13. FIGS. 11 to 13 are diagrams to illustrate positional relationships in the longitudinal direction between a sheet passing region and members such as the thermal equalization plate and the thermistor, and temperature distributions of the heaters in the longitudinal direction. FIGS. 11 and 12 are diagrams illustrating temperature distributions of the heaters in fixing devices including thermal equalization plates 280 and 290 different from the thermal equalization plate 28 according to the present embodiment. FIG. 13 is a diagram illustrating the temperature distribution of the heater in the fixing device including the thermal equalization plate according to the present embodiment. In each of FIGS. 11 to 13, an alternate long and short dash line indicates the temperature distribution of the heater 22 from the center position D1 of the main heat generation region D to the left end of the heater 22 in the longitudinal direction. FIGS. 11 to 13 illustrate the temperature distributions of the heaters, but the temperature distribution of the fixing belt also tends to be similar to the temperature distribution of the heater.

As illustrated in FIG. 11, in the longitudinal direction, the center position D1 of the main heat generation region D coincides with the center position of a maximum sheet passing region E as a maximum recording medium passing region through which a sheet P1 having the largest width in sheets passing through the fixing device 9 passes. However, the present disclosure is not limited to this, and the center position D1 may not coincide with the center position of the maximum sheet passing region. The maximum sheet passing region E is a region in a case where the sheet P1 is conveyed without positional deviation in the longitudinal direction.

In FIG. 11, the thermal equalization plate 280 is disposed to cover the entire region of the main heat generation region D in the longitudinal direction, and each of both ends of the thermal equalization plate 280 in the longitudinal direction extends to the outside of the main heat generation region D. Thus, in the entire region in which the resistive heat generators 31 generate heat, the thermal equalization plate 280 enhances heat transfer in the longitudinal direction to reduce a temperature unevenness in the longitudinal direction.

The thermal equalization plate 280 extends from one end to the other end in the longitudinal direction, and a length from the center position D1 to the one end in the longitudinal direction is not largely different from a length from the center position D1 to the other end in the longitudinal direction. In the above-described structure, a bent portion 280*a* on the one end in the longitudinal direction that is a left end of the thermal equalization plate 280 in FIG. 11 is close to the thermistor 25 disposed at a position corresponding to the one end of the heater 22 in the longitudinal direction. As a result, the insulation distance H2 is not enough.

In contrast, the thermal equalization plate 290 illustrated in FIG. 12 has a longer length from the center position D1 to one end in the longitudinal direction than the thermal equalization plate 280 illustrated in FIG. 11. The above-described structure in FIG. 12 can increase the distance from a bent portion 290*a* to the solder portion 255 in the longitudinal direction and obtain a larger insulation distance H3.

However, increasing the length from the center position D1 to the one end of the thermal equalization plate 290 in the longitudinal direction increases an amount of heat flowing from the one end of the heat generation region D of the heater 22 to the one end of the thermal equalization plate 290 outside the heat generation region D. As a result, as indicated by the alternate long and short dash line illustrated in a lower part of FIG. 12, the temperature of one end of the heater 22 in the longitudinal direction is largely decreased with respect to the temperature of the center position D1 of the heater 22, increasing the temperature unevenness of the heater 22 in the longitudinal direction. This adversely affects the fixing performance of the one end of the toner image in the longitudinal direction. In particular, the temperature of the heater 22 decreases toward the outside, that is, the one end of the heater 22 in the longitudinal direction. In the maximum sheet passing region D, the temperature at one end in the longitudinal direction is the lowest.

The thermal equalization plate 28 of the present embodiment illustrated in FIG. 13 extends to have a longer length from the center position D1 to the one end in the longitudinal direction than a length from the center position D1 to the other end, which is similar to the thermal equalization plate 290. This allows setting a sufficient insulation distance H1 between the thermal equalization plate 28 and the thermistor 25. The bent portion 28*a* is disposed outside the thermistor 25 in the longitudinal direction and outside the one end of the main heat generation region D in the longitudinal direction. As a sufficient insulation distance, for example, the insulation distance H1 is preferably 2.5 mm or more.

Figure 24:
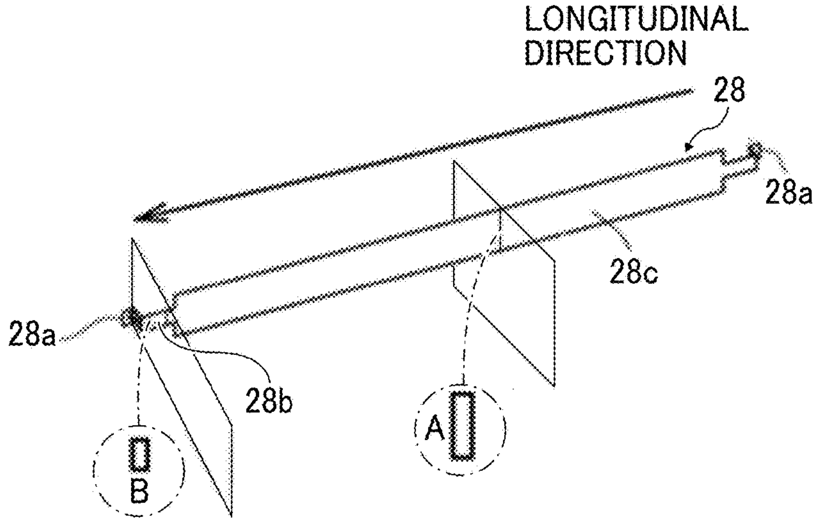
FIG. 24 is a perspective view of a thermal equalization plate to illustrate a cross-sectional area of a main portion of the thermal equalization plate and a cross-sectional area of an arm of the thermal equalization plate.

In addition, a portion including the one end of the thermal equalization plate 28 of the present embodiment in the longitudinal direction has the thermal capacity smaller than the thermal capacity of the main portion 28*c* of the thermal equalization plate 28. The portion including the one end of the thermal equalization plate 28 is referred to as an arm 28*b*. The arm 28*b* is designed to have a cross-sectional area smaller than the maximum cross-sectional area of the thermal equalization plate 28. The cross-sectional area is an area in a cross section orthogonal to the longitudinal direction. For example, as illustrated in FIG. 24, the cross-sectional area of the main portion 28*c* of the thermal equalization plate 28 in the cross section B orthogonal to the longitudinal direction is smaller than the cross-sectional area of the arm 28*b* in the cross section A orthogonal to the longitudinal direction.

The arm 28*b* is a part of the thermal equalization plate 28. Specifically, the arm 28*b* is a part or an entire of a part of the thermal equalization plate 28 between the bent portion 28*a* and the position of the thermal equalization plate 28 closest to the thermistor 25 (that is, the position of the left end of the thermistor 25 in FIG. 13). The arm 28*b* is a part of the thermal equalization plate 28 outside the main heat generation region D in the longitudinal direction. The arm 28*b* extends from one end of the main portion 28*c* in the longitudinal direction, and the one end of the main portion 28*c* is closer to the thermistor 25 as the temperature sensor than another end of the main portion 28*c* in the longitudinal direction.

The thermal equalization plate 28 of the present embodiment has the maximum cross-sectional area in a part of the thermal equalization plate 28 facing the maximum sheet passing region E. The cross-sectional area of the arm 28*b* is smaller than the maximum cross-sectional area of the thermal equalization plate 28 in the present embodiment but may be smaller than a cross-sectional area of a part of the thermal equalization plate 28 corresponding to the main heat generation region D, the maximum sheet passing region E, a center region of the main heat generation region D in the longitudinal direction, or a center region of the maximum sheet passing region E in the longitudinal direction. The cross-sectional area of the arm 28*b* may be smaller than a cross-sectional area of the thermal equalization plate 28 at the position corresponding to the center position D1. In other words, the main portion 28*c* has a first cross-sectional area in a cross section orthogonal to the longitudinal direction, and the arm 28*b* has a second cross-sectional area in a cross-section orthogonal to the longitudinal direction smaller than the first cross-sectional area of the main portion 28*c*.

Reducing the cross-sectional area of the arm 28*b* reduces the thermal capacity of a portion of the thermal equalization plate 28 that is the portion from the center of the thermal equalization plate 28 to the one end of the thermal equalization plate 28 in the longitudinal direction to be smaller than the thermal capacity of a portion of the thermal equalization plate 290 illustrated in FIG. 12 that is the portion from the center of the thermal equalization plate 290 to the one end of the thermal equalization plate 290 in the longitudinal direction. As a result, reducing the cross-sectional area of the arm 28*b* reduces the amount of heat flowing from the one end of the main heat generation region D to the outside of the main heat generation region D. As indicated by the alternate long and short dash line in FIG. 13, the above-described configuration can reduce the temperature decrease at the one end of the heater 22 in the longitudinal direction. In other words, the amount of temperature decrease in a portion to the one end in the longitudinal direction of the heater 22 can be reduced with respect to the length of the thermal equalization plate 28 extending to one end in the longitudinal direction. The above-described configuration can reduce the temperature decrease in a region from the center position D1 to the one end of the heater 22 in the longitudinal direction, which means that, for example, the above-described configuration can reduce the difference between the temperature of the heater 22 at the center position D1 and the temperature of the heater 22 at the position corresponding to the one end of the maximum sheet passing region D. As a result, the adverse effect on the fixing performance can be prevented. In the present embodiment, reducing the width of the arm 28*b* in the short-side direction of the thermal equalization plate 28 reduces the cross-sectional area of the arm 28*b*. In other words, the main portion 28*c* has a first width in the short-side direction orthogonal to the longitudinal direction, and the arm 28*b* has a second width smaller than the first width of the main portion 28*c* in the short-side direction. Reducing the width of the arm 28*b* in the short-side direction of the thermal equalization plate 28 to form the arm 28*b* is easy processing, which enables easily forming the arm 28*b* having a small thermal capacity.

The above-described configuration according to the present embodiment can increase the length in the longitudinal direction between the bent portion 28*a* and the solder portion 255 of the thermistor 25 to obtain the sufficient insulation distance and reduce the temperature decrease of the heater 22 in the region of the heater in which the thermistor 25 is disposed, so that the adverse effect on the fixing performance can be prevented.

The base 30 in the present embodiment has a length from the center position D1 to one end of the base 30 in the longitudinal direction that is shorter than a length from the center position D1 to the other end of the base 30, and the thermistor 25 and the arm 28*b* of the thermal equalization plate 28 are disposed to face the one end of the base 30 that is in a left part of the heater 22 in FIG. 13. In a longer region of the base 30 from the center position D1 to the other end of the base 30 than a region of the base 30 from the center position D1 to the one end of the base 30, the heat generated by the heater easily flows to the outside of the heater 22 in the longitudinal direction, and the temperature in the longer region easily decreases. Extending the length of the thermal equalization plate 28 on the region of the base 30 from the center position D1 to the one end of the base 30, which is the opposite region of the base 30 from the center position D1 to the other end of the base 30, can reduce a temperature difference in the longitudinal direction of the heater 22 caused by the base 30.

Extending the thermal equalization plate 28 to the outside of the main heat generation region D in the longitudinal direction can reduce the temperature rise at the end of the non-sheet passing region.

Reducing the width of the bent portion 28*a* and the width of the arm 28*b* adjacent to the bent portion 28*a* in the short-side direction of the thermal equalization plate 28 to be smaller than the width of the main portion 28*c* can enhance the assembly workability to assemble the thermal equalization plate 28 to the heater holder 23.

Figure 14:
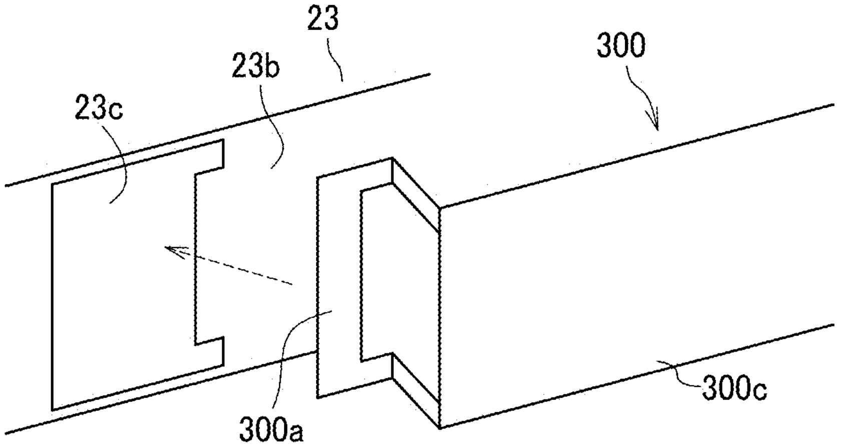
FIG. 14 is a perspective view of a part of a heater holder and a thermal equalization plate that is different from a thermal equalization plate of an embodiment of the present disclosure and is attached to the heater holder.

A thermal equalization plate 300 illustrated in FIG. 14 is different from the thermal equalization plate 28 according to the present embodiment and has a bent portion 300*a* having the same width as the width of a main portion 300*c* that is a part of the thermal equalization plate 300 other than the bent portion 300*a*. The heater holder 23 has the thermal equalization plate holding hole 23*c* having a large width in the short-side direction corresponding to the width of the bent portion 300*a* in the recess 23*b*. The margin of the width of the thermal equalization plate holding hole 23*c* in the short-side direction is small with respect to the width of the bent portion 300*a* in the short-side direction.

Figure 15A:
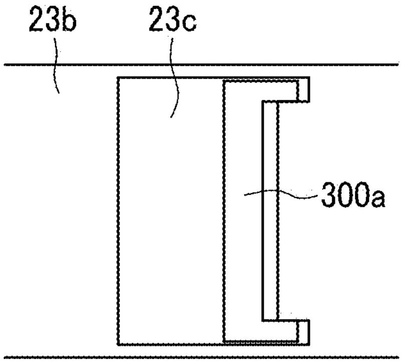
FIG. 15A is a plan view of a bent portion of the thermal equalization plate of FIG. 14 that is placed to be in parallel to a heater holder and inserted into a thermal equalization plate holding hole of the heater holder.

In this case, horizontally placing the thermal equalization plate 300 to be in parallel with the recess 23*b* and attaching the thermal equalization plate 300 into the recess 23*b* as illustrated in FIG. 15A does not cause the interference between the bent portion 300*a* and the heater holder 23.

Figure 15B:
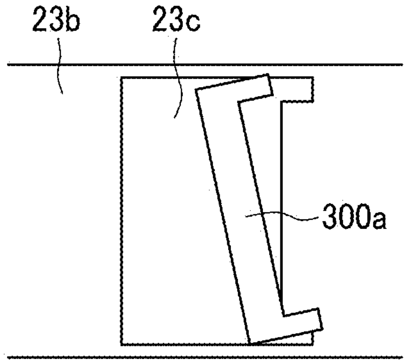
FIG. 15B is a plan view of a bent portion of the thermal equalization plate of FIG. 14 that is placed to be inclined with respect to a heater holder and inserted into a thermal equalization plate holding hole of the heater holder.

On the other hand, inserting the bent portion 300*a* of the thermal equalization plate 300 inclined with respect to the recess 23*b* into the thermal equalization plate holding hole 23*c* as illustrated in FIG. 15 is likely to cause the interference between the bent portion 300*a* and the wall forming the recess 23*b* in the heater holder 23. This adversely affects the assembly workability to assemble the thermal equalization plate 300 to the heater holder 23.

Figure 16A:
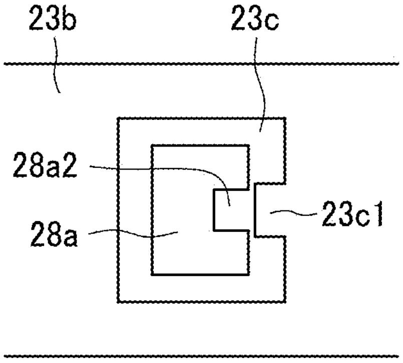
FIG. 16A is a plan view of a bent portion of a thermal equalization plate according to an embodiment of the present disclosure that is placed to be in parallel to a heater holder and inserted into a thermal equalization plate holding hole of the heater holder.

In contrast, setting the width of the bent portion 28*a* and the width of the arm 28*b* adjacent to the bent portion 28*a* in the present embodiment to be small in the short-side direction as described above (see FIG. 8) enables setting a large margin of the width of the thermal equalization plate holding hole 23*c* in the short-side direction with respect to the width of the bent portion 28*a* in the short-side direction as illustrated in FIG. 16A.

Figure 16B:
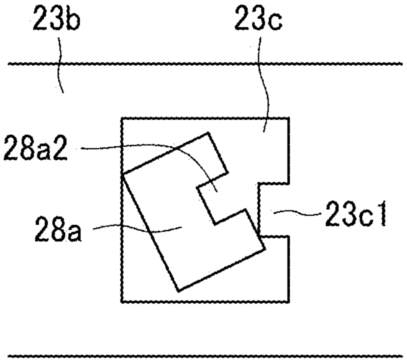
FIG. 16B is a plan view of a bent portion of the thermal equalization plate of FIG. 16A that is placed to be inclined with respect to a heater holder and inserted into a thermal equalization plate holding hole of the heater holder.

Accordingly, inserting the bent portion 28*a* of the thermal equalization plate 28 inclined with respect to the recess 23*b* into the thermal equalization plate holding hole 23*c* as illustrated in FIG. 16B does not cause the interference between the bent portion 28*a* and the heater holder 23. As a result, the assembly workability to assemble the thermal equalization plate 28 to the heater holder 23 can be enhanced. The bent portion 28*a* and the arm 28*b* that have small widths in the short-side direction as illustrated in FIG. 8 are less likely to interfere with a corner 23*e* of the heater holder 23 when the thermal equalization plate 28 is assembled to the heater holder 23. As a result, the assembly workability to assemble the thermal equalization plate 28 to the heater holder 23 can be enhanced.

Preferably, the thermal equalization plate 28 is made of aluminum alloy, steel, or graphite that each have high thermal conductivity. The thermal equalization plate 28 made of the above-described material can effectively reduce the temperature unevenness in the heater 22 and the fixing belt in the longitudinal direction and thus reduce the temperature rise at the end of the heater 22 and the fixing belt and a temperature drop at the end of the heater 22 and the fixing belt.

Disposing the heat sensitive element 251 of the thermistor 25 close to the end in the longitudinal direction in the maximum sheet passing region E and inside the maximum sheet passing region E as illustrated in FIG. 13 enables the thermistor 25 to detect the temperature of the heater 22 at a position close to the end of the sheet in the longitudinal direction and enables reliably raising the temperature of the heater 22 and the temperature of the fixing belt at the position to the temperature enough to perform the fixing process. As a result, the fixing property at the end of the sheet in the longitudinal direction can be sufficiently obtained.

Figure 17:
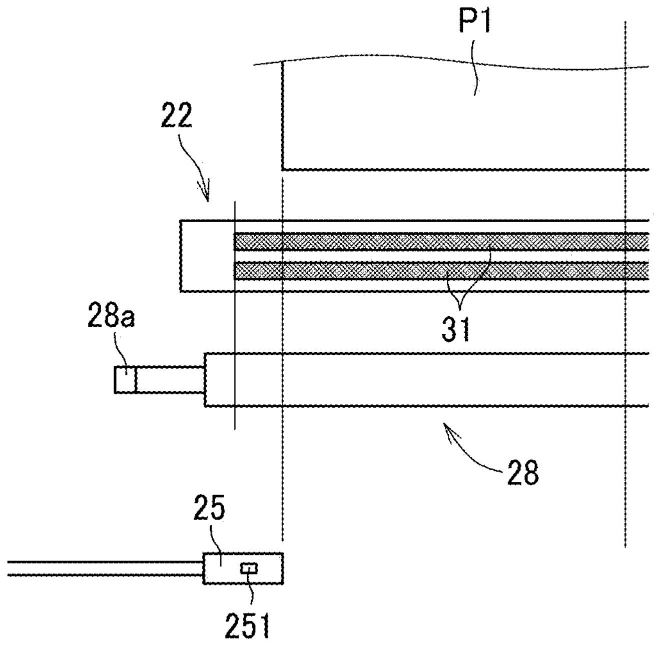
FIG. 17 is a diagram illustrating an arrangement of a thermistor disposed outside a maximum sheet passing region.

Disposing the heat sensitive element 251 of the thermistor 25 outside the maximum sheet passing region and inside the main heat generation region D in the longitudinal direction as illustrated in FIG. 17 enables the thermistor 25 to detect a temperature in a region in which the temperature is most likely to rise because the sheet does not absorb heat. This can prevent an abnormal temperature rise of the heater 22 and enhance the safety of the fixing device.

Figure 18A:
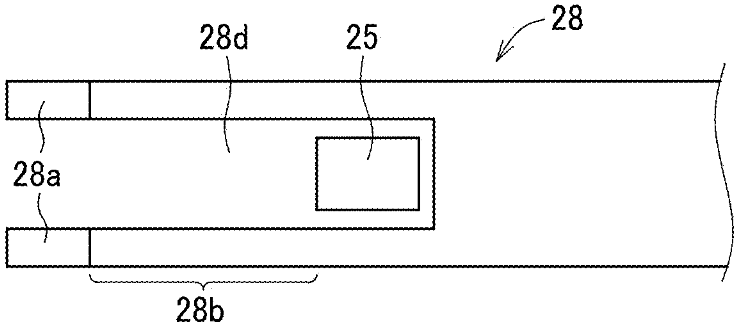
FIGS. 18A and 18B are plan views each illustrating a part of thermal equalization plate having a detector insertion hole.
Figure 18B:
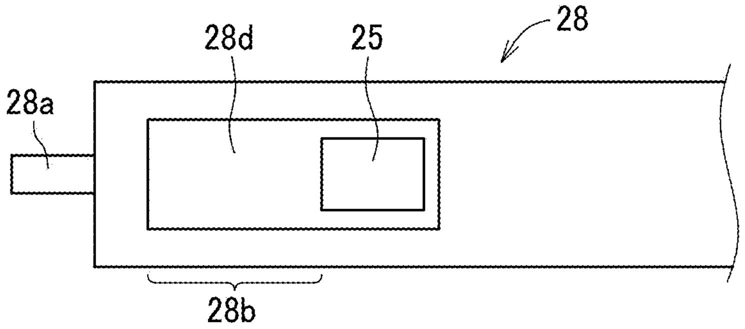

As illustrated in FIGS. 18A and 18B, the thermal equalization plate 28 may have a detector insertion hole 28*d* to fit the thermistor 25. The thermistor 25 inserted into the detector insertion hole 28*d* can directly contact the heater 22 and does not contact the heater 22 via the thermal equalization plate 28. The above-described configuration can enhance the response of the thermistor 25 to the temperature change of the heater 22 and the temperature change of the fixing belt, which enhances the safety of the fixing device. In addition, the above-described configuration enables the heater 22 to generate heat at a more appropriate timing, which enables energy-saving in the fixing device 9. In the present embodiment, the detector insertion hole 28*d* is extended to the outside in the longitudinal direction from a part in which the thermistor 25 is fitted to form the arms 28*b* in the extended part in the longitudinal direction. The arms 28*b* enable both obtaining the sufficient insulation distance and preventing the temperature drop at the end of the heater in the longitudinal direction as in the above-described embodiment. The thermistor 25 may be positioned at a position illustrated in FIG. 18A or 18B in the detector insertion hole 28*d* by a positioning portion such as a fitting portion. The arms 28*b* in FIG. 18A or 18B have a width in the short-side direction that is smaller than a width of the main portion 28*c* of the thermal equalization plate 28 in the short-side direction. In this specification, the width of the arms 28*b* means a sum of widths of the arms 28*b* disposed at an upper portion and a lower portion in the short-side direction, and the cross-sectional area of the arms 28*b* means a sum of cross-sectional areas of the arms 28*b* disposed at the upper portion and the lower portion in the short-side direction.

The thermal equalization plate 28 may be made of a graphene sheet. The thermal equalization plate 28 made of the graphene sheet has high thermal conductivity in a predetermined direction along the plane of the graphene, that is, not in the thickness direction but in the arrangement direction. Accordingly, the above-described structure can effectively reduce the temperature unevenness of the fixing belt 20 in the arrangement direction and the temperature unevenness of the heater 22 in the arrangement direction.

Figure 19:
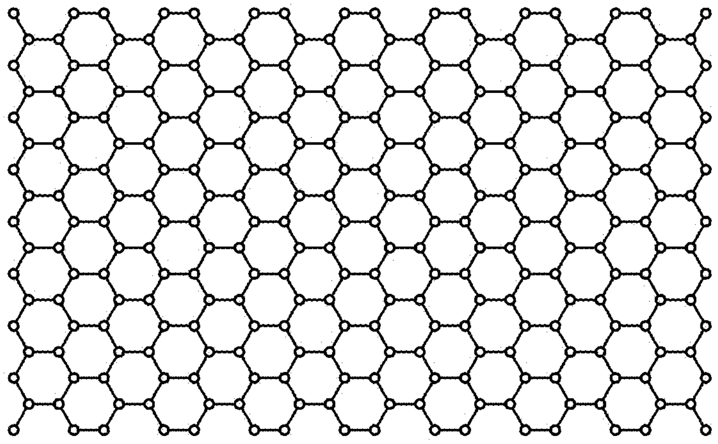
FIG. 19 is a schematic diagram illustrating a two-dimensional atomic crystal structure of graphene.

Graphene is a flaky powder. Graphene has a planar hexagonal lattice structure of carbon atoms, as illustrated in FIG. 19. The graphene sheet is typically a single layer. The single layer of carbon may contain impurities. The graphene may have a fullerene structure. The fullerene structures are typically recognized as compounds including an even number of carbon atoms, which form a cage-like fused ring polycyclic system with five and six membered rings, including, for example, C60, C70, and C80 fullerenes or other closed cage structures having three-coordinate carbon atoms.

Graphene sheets are artificially made by, for example, a chemical vapor deposition (CVD) method.

The graphene sheet is commercially available. The size and thickness of the graphene sheet or the number of layers of the graphite sheet described below are measured by, for example, a transmission electron microscope (TEM).

Figure 20:
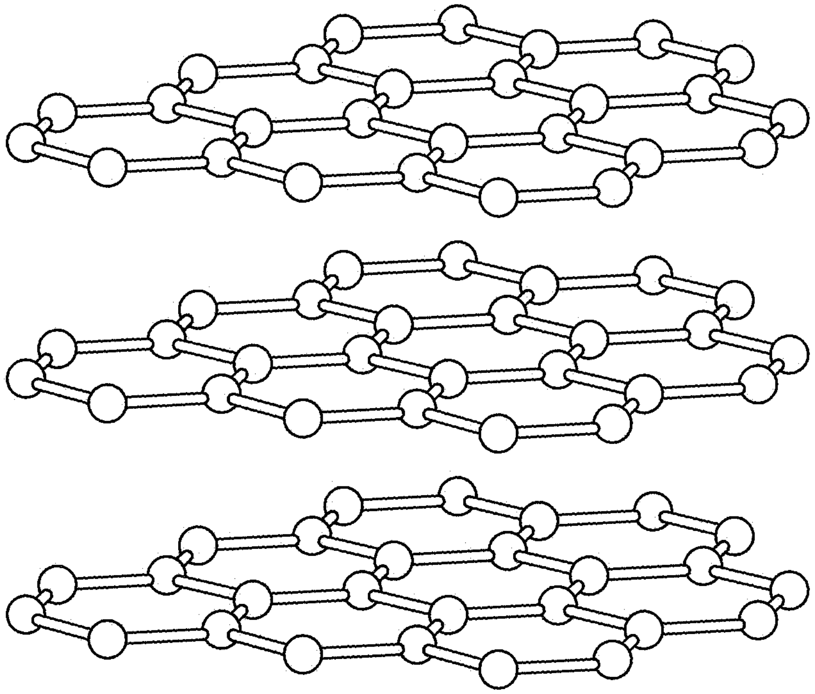
FIG. 20 is a schematic diagram illustrating a three-dimensional atomic crystal structure of graphite.

Graphite obtained by multilayering graphene has a large thermal conduction anisotropy. As illustrated in FIG. 20, graphite has a crystal structure formed by layering a number of layers each having a condensed six membered ring layer plane of carbon atoms extending in a planar shape. Among carbon atoms in this crystal structure, adjacent carbon atoms in the layer are coupled by a covalent bond, and carbon atoms between layers are coupled by a van der Waals bond. The covalent bond has a larger bonding force than a van der Waals bond. Therefore, there is a large anisotropy between the bond between carbon atoms in a layer and the bond between carbon atoms in different layers. As a result, the thermal equalization plate 28 made of graphite has the heat transfer efficiency in the arrangement direction greater than the heat transfer efficiency in the thickness direction of the thermal equalization plate 28 (that is, the stacking direction of these members), reducing the heat transferred to the heater holder 23. Accordingly, the above-described structure can efficiently decrease the temperature unevenness of the heater 22 in the arrangement direction and can minimize the heat transferred to the heater holder 23. Since the thermal equalization plate 28 made of graphite is not oxidized at about 700 degrees or lower, the thermal equalization plate 28 has an excellent heat resistance.

The physical properties and dimensions of the graphite sheet may be appropriately changed according to the function required for the thermal equalization plate 28. For example, the anisotropy of the thermal conduction can be increased by using high-purity graphite or single-crystal graphite or increasing the thickness of the graphite sheet. Using a thin graphite sheet can reduce the thermal capacity of the fixing device 9 so that the fixing device 9 can perform high speed printing. A width of the thermal equalization plate 28 in the direction intersecting the arrangement direction may be increased in response to a large width of the fixing nip N or a large width of the heater 22.

From the viewpoint of increasing mechanical strength, the number of layers of the graphite sheet is preferably 11 or more. The graphite sheet may partially include a single layer portion and a multilayer portion.

The above-described embodiments are illustrative and do not limit this disclosure. It is therefore to be understood that within the scope of the appended claims, numerous additional modifications and variations are possible to this disclosure otherwise than as specifically described herein.

Figure 21:
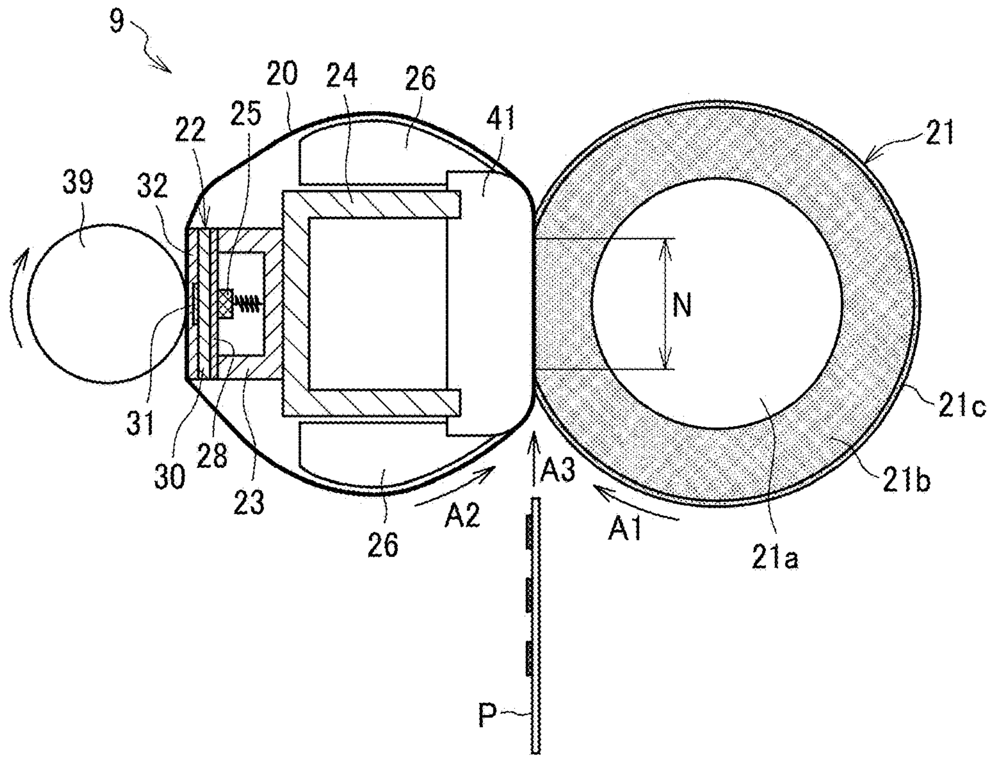
FIG. 21 is a cross-sectional side view of a schematic configuration of a fixing device different from the fixing devices illustrated in the above drawings.
Figure 22:
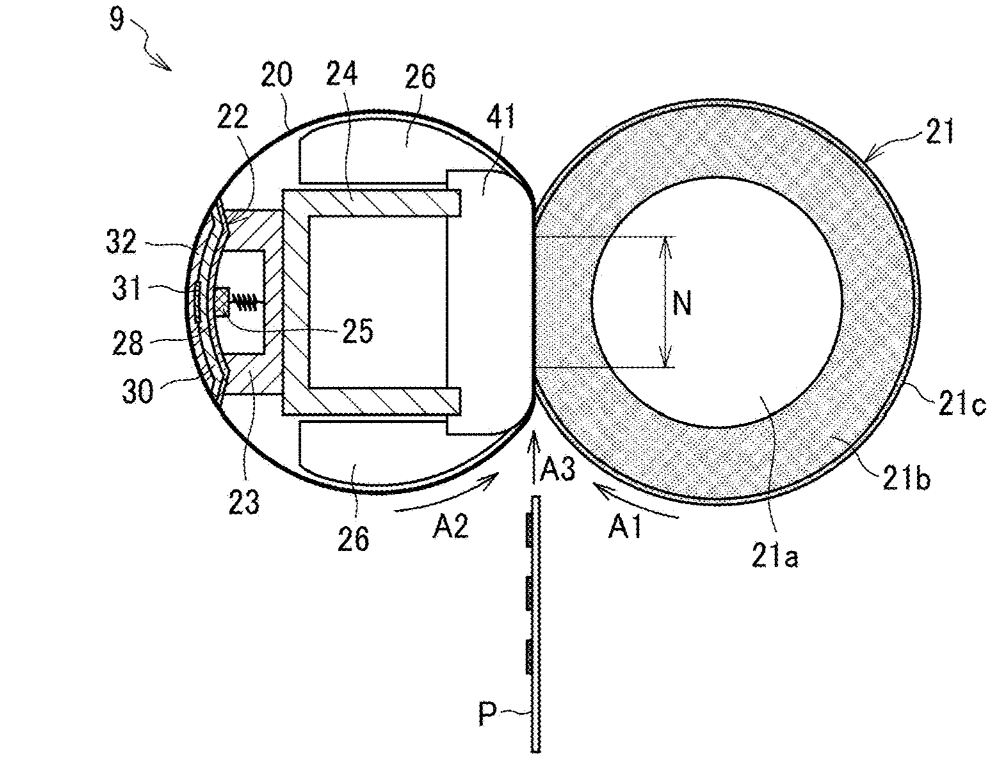
FIG. 22 is a cross-sectional side view of a schematic configuration of a fixing device different from the fixing devices illustrated in the above drawings.
Figure 23:
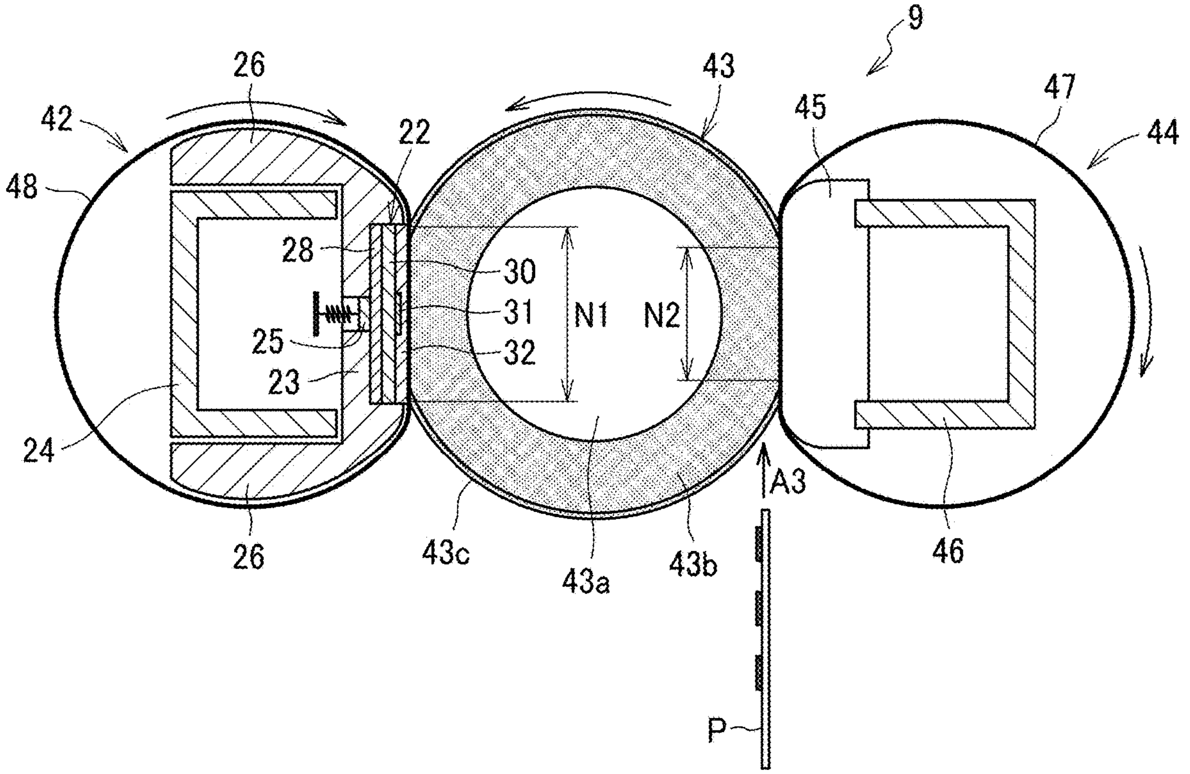
FIG. 23 is a cross-sectional side view of a schematic configuration of a fixing device different from the fixing devices illustrated in the above drawings.

The embodiments of the present disclosure are also applicable to the fixing devices as illustrated in FIGS. 21 to 23 other than the fixing devices described above. The configuration of each fixing device illustrated in FIGS. 21 to 23 is briefly described below.

The fixing device 9 illustrated in FIG. 21 includes a pressurization roller 39 opposite the pressure roller 21 with respect to the fixing belt 20. The pressurization roller 39 is an opposed rotator that rotates and is opposite the fixing belt 20 as the rotator. The fixing belt 20 is sandwiched by the pressurization roller 39 and the heater 22 and heated by the heater 22. On the other hand, a nip formation pad 41 is disposed inside the loop formed by the fixing belt 20 and disposed opposite the pressure roller 21. The nip formation pad 41 is supported by the stay 24. The nip formation pad 41 sandwiches the fixing belt 20 together with the pressure roller 21, thereby forming the fixing nip N.

A description is provided of the construction of the fixing device 9 as illustrated in FIG. 22. The fixing device 9 does not include the pressurization roller 39 described above with reference to FIG. 21. In order to attain a contact length for which the heater 22 contacts the fixing belt 20 in the circumferential direction thereof, the heater 22 is curved into an arc in cross section that corresponds to a curvature of the fixing belt 20. Other parts of the fixing device 9 illustrated in FIG. 22 are the same as the fixing device 9 illustrated in FIG. 21.

Finally, the fixing device 9 illustrated in FIG. 23 is described. The fixing device 9 includes a heating assembly 42, a fixing roller 43 that is the fixing rotator, and a pressure assembly 44 that is a facing member. The heating assembly 42 includes the heater 22, the thermal equalization plate 28, the heater holder 23, the stay 24, and a heating belt 48 as an example of a rotator, as described in the above-described embodiments. The fixing roller 43 is an opposed rotator that rotates and faces the heating belt 48 as the rotator. The fixing roller 43 includes a core 43*a*, an elastic layer 43*b*, and a release layer 43*c*. The core 43*a* is a solid core made of iron. The elastic layer 43*b* coats the circumferential surface of the core 43*a*. The release layer 43*c* coats an outer circumferential surface of the elastic layer 43*b*. The pressure assembly 44 is opposite to the heating assembly 42 with respect to the fixing roller 43. The pressure assembly 44 includes a nip formation pad 45 and a stay 46 inside the loop of a pressure belt 47, and the pressure belt 47 is rotatably arranged to wrap around the nip formation pad 45 and the stay 46. The sheet P passes through the fixing nip N2 between the pressure belt 47 and the fixing roller 43 to be heated and pressed to fix the image onto the sheet P.

The configurations of the thermal equalization plate 28 and the heater holder 23 of the above-described embodiments can be adopted in the fixing device of FIGS. 21 to 23. The configurations enable both obtaining the sufficient insulation distance between the thermal equalization plate 28 and the thermistor 25 and preventing the temperature drop at the end of the heater 22 in the longitudinal direction.

The heating device is not limited to the fixing devices described in the above embodiments. The present disclosure may be applied to, for example, a heating device such as a dryer to dry ink applied to the sheet, a coating device (a laminator) that heats, under pressure, a film serving as a covering member onto the surface of the sheet such as paper, and a thermocompression device such as a heat sealer that seals a seal portion of a packaging material with heat and pressure. Applying the present disclosure to the above heating devices enables both obtaining the sufficient insulation distance between a thermal equalization member and a temperature sensor and preventing the temperature drop at the end of the heater in the longitudinal direction.

The image forming apparatus according to the present embodiments of the present disclosure is applicable not only to the color image forming apparatus illustrated in FIG. 1 but also to a monochrome image forming apparatus, a copier, a printer, a facsimile machine, or a multifunction peripheral including at least two functions of the copier, printer, and facsimile machine.

The sheet is one example of a recording medium. The recording medium may be a sheet of plain paper, thick paper, thin paper, a postcard, an envelope, coated paper, art paper, tracing paper, overhead projector (OHP) sheet, plastic film, prepreg, copper foil, or the like.

Aspects of the present disclosure are, for example, as follows.

First Aspect

In a first aspect, a heating device includes a rotator, a heater, a holder, a temperature detector, and a high thermal conductor. The heater includes a base and a heat generator, and at least the heat generator is inside a loop of the rotator. The holder holds the heater. The high thermal conductor extends in a longitudinal direction of the rotator and has a thermal conductivity higher than the base. The heat generator is disposed in a main heat generation region extending in the longitudinal direction. The temperature detector is inside the loop of the rotator and faces one end of the main heat generation region. The high thermal conductor and the temperature detector are overlaid in a thickness direction of the base. When a center part of the main heat generation region is referred to as an inner portion in the longitudinal direction, and when one end or another end of the main heat generation region in the longitudinal direction with respect to the center part of the main heat generation region is referred to as an outer portion in the longitudinal direction, the high thermal conductor extends to outside the temperature detector and the one end of the main heat generation region in the longitudinal direction. The high thermal conductor has a projection projecting from a part of the high thermal conductor other than the projection toward the temperature detector in a thickness direction of the base. A predetermined insulation distance is set between the projection and the temperature detector. The high thermal conductor includes a first part. The first part is between the projection and a position on the temperature detector that is the closest position to the projection on the temperature detector. The high thermal conductor has a largest cross-sectional area in a cross section orthogonal to the longitudinal direction. A cross-sectional area of the first part in a cross section orthogonal to the longitudinal direction is smaller than the largest cross-sectional area.

Second Aspect

In a second aspect, the base in the heating device according to the first aspect has a length from a center position of the main heat generation region to one end of the base that is shorter than a length from the center position of the main heat generation region to another end of the base.

Third Aspect

In a third aspect, the first part in the heating device according to the first aspect or the second aspect extends in the longitudinal direction and is outside the one end of the main heat generation region in the longitudinal direction.

Fourth Aspect

In a fourth aspect, a width of the first part in a short-side direction orthogonal to the longitudinal direction in the heating device according to any one of the first to third aspects is smaller than a maximum width of the high thermal conductor in the short-side direction.

Fifth Aspect

In a fifth aspect, the high thermal conductor in the heating device according to any one of the first to fourth aspects has a detector insertion hole into which the temperature detector is inserted, and the detector insertion hole extends from a part to insert the temperature sensor toward one end of the high thermal conductor in the longitudinal direction. An extended part of the detector insertion hole in the longitudinal direction is adjacent to the first part.

Sixth Aspect

In a sixth aspect, the high thermal conductor in the heating device according to any one of the first to fifth aspects is made from one of aluminum alloy, steel, and graphite.

Seventh Aspect

In a seventh aspect, the high thermal conductor in the heating device according to any one of the first to sixth aspects is made from a plate, and the projection is a bent portion formed by bending one end of the plate in the longitudinal direction.

Eighth Aspect

In an eighth aspect, the bent portion in the heating device according to the seventh aspect is formed by bending the one end of the plate in the longitudinal direction twice, and the holder has a holding hole. The bent portion is inserted into the holding hole, and an end of the bent portion is engaged with the holder in a thickness direction of the base.

Ninth Aspect

In a ninth aspect, the temperature sensor in the heating device according to any one of the first to eighth aspects includes a temperature detector facing a maximum passing region through which a maximum recording medium having a maximum width in the longitudinal direction of recording media used in the heating device passes.

Tenth Aspect

In a tenth aspect, the temperature sensor in the heating device according to any one of the first to ninth aspects includes a temperature detector disposed at a position in the longitudinal direction that is inside the main heat generation region and outside a maximum passing region through which a maximum recording medium having a maximum width in the longitudinal direction of recording media used in the heating device passes.

Eleventh Aspect

In an eleventh aspect, the insulation distance in the heating device according to any one of the first to tenth aspects is 2.5 mm or more.

Twelfth Aspect

In a twelfth aspect, a fixing device includes the heating device according to any one of the first to twelfth aspects. The heater includes a base and a heat generator, and at least the heat generator is inside a loop of the rotator. The holder holds the heater. The high thermal conductor extends in a longitudinal direction of the rotator and has a thermal conductivity higher than the base. The heat generator is disposed in a main heat generation region extending in the longitudinal direction. The temperature detector is inside the loop of the rotator and faces one end of the main heat generation region. The high thermal conductor and the temperature detector are overlaid in a thickness direction of the base. When a center part of the main heat generation region is referred to as an inner portion in the longitudinal direction, and when one end or another end of the main heat generation region in the longitudinal direction with respect to the center part of the main heat generation region is referred to as an outer portion in the longitudinal direction, the high thermal conductor extends to outside the temperature detector and the one end of the main heat generation region in the longitudinal direction. The high thermal conductor has a projection projecting from a part of the high thermal conductor other than the projection toward the temperature detector in a thickness direction of the base. A predetermined insulation distance is set between the projection and the temperature detector. The high thermal conductor includes a first part. The first part is between the projection and a position on the temperature detector that is the closest position to the projection on the temperature detector. The high thermal conductor has a largest width in a short-side direction orthogonal to the longitudinal direction. A width of the first part in the short-side direction is smaller than the largest width.

Thirteenth Aspect

In a thirteenth aspect, a fixing device uses the heating device according to any one of the first to twelfth aspects to heat a recording medium and fix an image on the recording medium onto the recording medium.

Fourteenth Aspect

In a fourteenth aspect, an image forming apparatus includes the fixing device according to the thirteenth aspect.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A heating device comprising:
a rotator;
a heater facing an inner face of the rotator and extending in a longitudinal direction, the heater including:
a base; and
a heat generator having a main heat generation region extending from one end to another end in the longitudinal direction;
a holder holding the heater;
a temperature sensor:
disposed inside a loop of the rotator;
facing one end of the main heat generation region; and
including a terminal; and
a thermal conductor on the heater, the thermal conductor extending in the longitudinal direction and having a thermal conductivity higher than the base of the heater, the thermal conductor including:
a main portion having a first cross-sectional area in a cross section orthogonal to the longitudinal direction;
an arm extending from one end of the main portion in the longitudinal direction, the one end closer to the temperature sensor than another end of the main portion,
the arm having a second cross-sectional area in a cross-section orthogonal to the longitudinal direction smaller than the first cross-sectional area of the main portion; and
a projection at one end of the arm projecting from one end of the arm in the longitudinal direction, the projection being separated from the terminal of the temperature sensor by an insulation distance or more in the longitudinal direction;
wherein the thermal conductor includes a plate,
the projection includes a bent portion formed by bending one end of the plate in the longitudinal direction twice,
the holder has a holding hole,
the bent portion is inserted into the holding hole, and
a distal end of the bent portion abuts against a back side of the holder so as to engage the bent portion with the holder in the thickness direction and prevent the thermal conductor from being detached from the holder in the thickness direction.

2. The heating device according to claim 1,
wherein the base extends from one end to another end in the longitudinal direction, and
a length from a center of the main heat generation region to the one end of the base is shorter than a length from the center of the main heat generation region to said another end of the base.

3. The heating device according to claim 1,
wherein the arm extending in the longitudinal direction is outside the main heat generation region in the longitudinal direction.

4. The heating device according to claim 1,
wherein the main portion of the thermal conductor has a first width in a short-side direction orthogonal to the longitudinal direction, and
the arm has a second width smaller than the first width of the main portion in the short-side direction.

5. The heating device according to claim 1,
wherein the thermal conductor has a detector insertion hole, adjacent to the arm, to insert the temperature sensor, and
the detector insertion hole extends outside the temperature sensor in the longitudinal direction.

6. The heating device according to claim 1,
wherein the thermal conductor is made of one of aluminum alloy, steel, and graphite.

7. The heating device according to claim 1,
wherein the temperature sensor includes a temperature detector facing a maximum recording medium passing region through which a maximum recording medium having a maximum width of recording media in the longitudinal direction used in the heating device passes.

8. The heating device according to claim 1,
wherein the temperature sensor includes a temperature detector disposed at a position in the longitudinal direction that is inside the main heat generation region and outside a maximum recording medium passing region through which a maximum recording medium having a maximum width of recording media in the longitudinal direction used in the heating device passes.

9. The heating device according to claim 1, wherein the insulation distance is 2.5 mm or more.

10. A fixing device comprising the heating device according to claim 1.

11. An image forming apparatus comprising the fixing device according to claim 10.

12. The heating device according to claim 1, wherein the projection is disposed outside the temperature sensor and outside the one end of the main heat generation region in the longitudinal direction, and the arm has a thermal capacity smaller than the main portion.

13. The heating device according to claim 1, wherein the arm is located, in the longitudinal direction, between the projection and a position of the thermal conductor closest to the temperature sensor.

14. The heating device according to claim 1, wherein the projection is a portion of the thermal conductor closest to the terminal of the temperature sensor in the longitudinal direction.

15. The heating device according to claim 1, wherein the temperature sensor includes a temperature detector contacting the thermal conductor through an insulator, and the terminal of the temperature sensor is located, in the longitudinal direction, between the temperature detector and the projection.

16. A heating device comprising:

a rotator;

a heater facing an inner face of the rotator and extending in a longitudinal direction, the heater including:

a base; and a heat generator having a main heat generation region extending from one end to another end in the longitudinal direction;

a holder holding the heater;

a temperature sensor:

disposed inside a loop of the rotator;

facing one end of the main heat generation region; and including a terminal;

a thermal conductor on the heater, the thermal conductor extending in the longitudinal direction and having a thermal conductivity higher than the base of the heater, the thermal conductor including:

a main portion having a first width in a short-side direction orthogonal to the longitudinal direction;

an arm extending from one end of the main portion in the longitudinal direction, the one end closer to the temperature sensor than another end of the main portion, the arm having a second width in the short-side direction smaller than the first width of the main portion; and a projection projecting from one end of the arm in the longitudinal direction, the projection being separated from the terminal of the temperature sensor by an insulation distance or more in the longitudinal direction;

wherein the thermal conductor includes a plate, the projection includes a bent portion formed by bending one end of the plate in the longitudinal direction twice, the holder has a holding hole, the bent portion is inserted into the holding hole, and a distal end of the bent portion abuts against a back side of the holder so as to engage the bent portion with the holder in the thickness direction and prevent the thermal conductor from being detached from the holder in the thickness direction.

17. A fixing device comprising the heating device according to claim 16.

18. An image forming apparatus comprising the fixing device according to claim 17.

* * * * *